United States Patent
Seo et al.

(10) Patent No.: US 11,927,726 B2
(45) Date of Patent: Mar. 12, 2024

(54) OPTICAL LENS SYSTEM AND ELECTRONIC DEVICE INCLUDING THE SAME

(71) Applicant: Samsung Electronics Co., Ltd., Gyeonggi-do (KR)

(72) Inventors: Jungpa Seo, Gyeonggi-do (KR); Hokeun Kwak, Gyeonggi-do (KR); Seungyong Kim, Gyeonggi-do (KR); Sungwook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 16/861,469

(22) Filed: Apr. 29, 2020

(65) Prior Publication Data
US 2020/0348493 A1 Nov. 5, 2020

(30) Foreign Application Priority Data
May 3, 2019 (KR) .................. 10-2019-0052500

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .... G02B 13/0045; G02B 13/004; G02B 9/62; G02B 9/64; G02B 9/60; G02B 9/04–32; G02B 9/34–58; G02B 3/04; G02B 7/021; H04N 5/2254

USPC ............... 359/233, 646, 659–661, 676, 708, 359/713–717, 733–736, 738–739, 359/763–795
See application file for complete search history.

(56) References Cited

U.S. PATENT DOCUMENTS

| | | |
|---|---|---|
| 2008/0123191 A1 | 5/2008 | Suzaki et al. |
| 2012/0250167 A1 | 10/2012 | Hashimoto |
| 2015/0247994 A1 | 9/2015 | Tomioka |
| 2015/0362703 A1 | 12/2015 | Park |
| 2016/0139368 A1 | 5/2016 | You |

(Continued)

FOREIGN PATENT DOCUMENTS

| | | | | |
|---|---|---|---|---|
| JP | 2010096820 A | * | 4/2010 | ......... G02B 13/0035 |
| JP | 2012-096820 A | | 5/2012 | |

(Continued)

OTHER PUBLICATIONS

Machine translation of WO2019207923 (Year: 2023).*

(Continued)

*Primary Examiner* — Travis S Fissel
(74) *Attorney, Agent, or Firm* — Cha & Reiter, LLC

(57) ABSTRACT

According to certain embodiments, an electronic device comprises a window member; a display panel stacked on a rear surface of the window member; a lens assembly; an iris; and an image sensor including an image plane configured to form an electronic signal representing an image formed by the lens assembly, wherein the iris is fixed with respect to the image plane, wherein at least a portion of the iris is located on a same plane as at least a portion of the display panel, and the iris is located closer to an object-side than an object-side surface of a lens closest to the object-side of the lens assembly on an optical axis.

19 Claims, 17 Drawing Sheets

(56) References Cited

U.S. PATENT DOCUMENTS

| | | | |
|---|---|---|---|
| 2016/0161664 A1* | 6/2016 | Ishida | G02B 6/0045 |
| | | | 359/230 |
| 2016/0161714 A1 | 6/2016 | Lee et al. | |
| 2017/0251137 A1* | 8/2017 | Evans, V | G02F 1/133526 |
| 2018/0013944 A1 | 1/2018 | Evans, V et al. | |
| 2018/0239117 A1 | 8/2018 | Lee et al. | |
| 2019/0079262 A1 | 3/2019 | Wang et al. | |

FOREIGN PATENT DOCUMENTS

| | | | | |
|---|---|---|---|---|
| JP | 2012-208326 A | 10/2012 | | |
| JP | 2015-161880 A | 9/2015 | | |
| KR | 10-2007-0122016 A | 12/2007 | | |
| KR | 10-2010-0060315 A | 6/2010 | | |
| KR | 10-2012-0033866 A | 4/2012 | | |
| KR | 10-2016-0069389 A | 6/2016 | | |
| KR | 10-2016-0076341 A | 6/2016 | | |
| WO | WO-2019207923 A1 * | 2/2019 | ....... | H04N 5/232123 |

OTHER PUBLICATIONS

International Search Report dated Aug. 14, 2020.
European Search Report dated Oct. 9, 2020.
Chinese Examination Report dated Jun. 29, 2023.
European Examination Report dated Aug. 4, 2023.
Indian Examination Report dated Dec. 18, 2023.

* cited by examiner

OPTICAL LENS SYSTEM AND ELECTRONIC DEVICE INCLUDING THE SAME

CROSS-REFERENCE TO RELATED APPLICATION(S)

This application is based on and claims priority under 35 U.S.C. 119 to Korean Patent Application No. 10-2019-0052500, filed on May 3, 2019, in the Korean Intellectual Property Office, the disclosure of which is herein incorporated by reference in its entirety.

TECHNICAL FIELD

Background

1. Field

Certain embodiments relate to an optical lens system and an electronic device including the same.

2. Description of Related Art

Cameras are a useful feature in electronic devices such as smartphones but can detract from the aesthetic appearance of the electronic device. An electronic device that close to fully covered by a display is aesthetically pleasing. However, cameras can consume portions of the surface of the electronic device. Moreover, to provide high quality video/photographs, the number of cameras increases. Accordingly, it is important to provide full camera functionality in an electronic device while preserving its aesthetic appearance.

The above information is presented as background information only to assist with an understanding of the disclosure. No determination has been made, and no assertion is made, as to whether any of the above might be applicable as prior art with regard to the disclosure.

SUMMARY

According to certain embodiments, an optical lens system may include a lens assembly, an iris, and an image sensor configured to form an image of an object corresponding to the lens assembly. The lens assembly may include a first lens having positive refractive power, and a second lens having negative refractive power. The iris, the first lens, and the second lens may be sequentially arranged from an object-side to the image sensor-side along an optical axis, and the optical lens system of the electronic device may satisfy Equations 1 and 2 below:

$$1.1 \leq \frac{STL}{TL} \leq 1.5 \quad \text{[Equation 1]}$$

$$0.2 \leq \frac{S1}{EPD} \leq 1.0 \quad \text{[Equation 2]}$$

wherein, STL is a distance from the iris to an image plane of the image sensor on the optical axis, TL is a distance from an object-side apex of the first lens to the image plane on the optical axis, EPD is a diameter of an entrance pupil of the optical lens system, and S1 is a distance from the iris to the first lens).

According to certain embodiments, an electronic device comprises an iris; a lens assembly movable in an optical axis direction; and an image sensor having an image plane configured to form an electronic signal representing an image formed by light from the lens assembly, wherein, when focusing the image formed on the image plane, a distance between the iris and the image plane is fixed, and the lens assembly moves in the optical axis direction.

According to certain embodiments, an electronic device comprises a window member; a display panel stacked on a rear surface of the window member; a lens assembly; an iris; and an image sensor including an image plane configured to form an electronic signal representing an image formed by the lens assembly, wherein the iris is fixed with respect to the image plane, wherein at least a portion of the iris is located on a same plane as at least a portion of the display panel, and the iris is located closer to an object-side than an object-side surface of a lens closest to the object-side of the lens assembly on an optical axis.

According to certain embodiments, an optical lens system of an electronic device, the optical lens system comprises a lens assembly; an iris; and an image sensor configured to form an image of an object corresponding to the lens assembly, wherein the lens assembly includes: a front lens located closest from an object-side in the lens assembly; a first lens having positive refractive power; and a second lens having negative refractive power, wherein the iris, the front lens, the first lens, and the second lens are sequentially arranged from the object-side to an image sensor-side along an optical axis, and the optical lens system of the electronic device satisfies Equations 1 and 2 below:

$$1.1 \leq \frac{STL}{TL} \leq 1.5 \quad \text{[Equation 1]}$$

$$0.2 \leq \frac{S1}{EPD} \leq 1.0 \quad \text{[Equation 2]}$$

wherein, STL is a distance from the iris to an image plane of the image sensor on the optical axis, TL is a distance from an object-side apex of the front lens to the image plane on the optical axis, EPD is a diameter of an entrance pupil of the optical lens system, and S1 is a distance from the iris to the front lens.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1A:
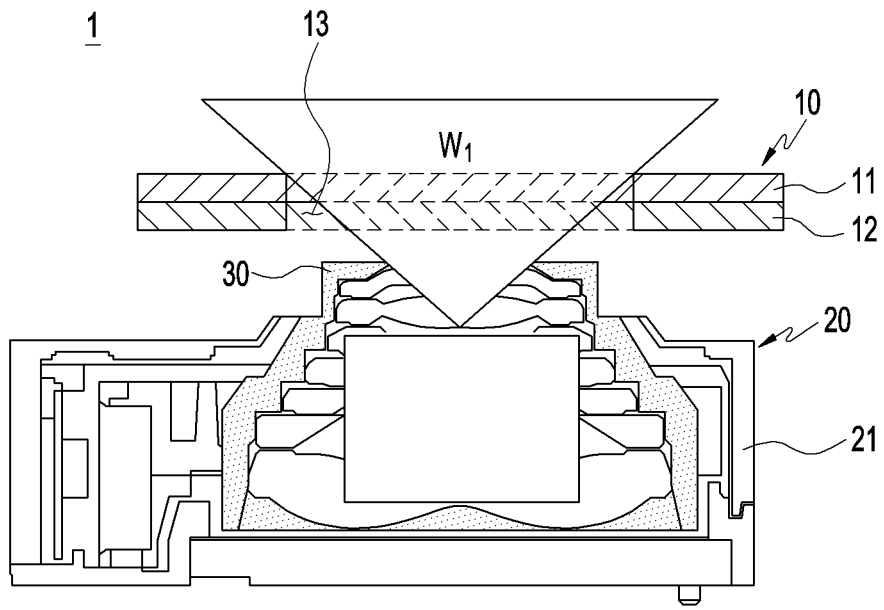
FIG. 1A is a view illustrating the configurations of an optical lens system according to some embodiments and an electronic device including the optical lens system.

Optical lens systems (or optical devices) such as a camera capable of capturing images or moving pictures have been widely used. Conventionally, film-based optical lens systems have been mainly used. In recent years, digital cameras or video cameras having a solid-state image sensor such as a charge-coupled device (CCD) or a complementary metal-oxide semiconductor (CMOS) video camera are becoming widespread. Optical lens systems, which adopt a solid image sensor (a CCD or a CMOS), are replacing film-based optical lens systems due to easy image storage and reproduction as well as easy movement compared to the film-based optical lens systems.

In order to acquire high-quality images and/or moving pictures, an optical lens system may include a plurality of lenses. An optical module constituted with a combination of plural lenses (e.g., a lens assembly) may have, for example, a lower F number (the ratio of the focal length to the diameter of the entrance pupil) and less aberration, thereby enabling high-quality (high-resolution) images and/or moving pictures to be acquired. In order to obtain a lower F number and less aberration, for example, in order to obtain a high-resolution and bright image, a large number of lenses may be required. Optical lens systems have generally been used in electronic devices specialized for photographing, such as digital cameras, but are also mounted in portable wireless terminals, such as smartphones.

An electronic device can include a front display in which the bezel area is minimized to provide a wider display area to a user. One entire surface of the electronic device can be covered with the display.

It is desirable to provide optical lens systems having various angles of view, such as a wide angle, an ultra-wide angle, or a telephoto, as well as optical lens systems capable of extracting fingerprint recognition information, iris recognition information, or depth information.

When employing such optical lens systems in an electronic device, the number of camera holes formed in the electronic device may increase together with the number of optical modules (e.g., lens assemblies) included in each optical lens system. The increase in the number of optical modules detracts from the aesthetic appearance of the camera and reduces the functional display area. For example, in the case of "selfie" camera, it may be difficult to sufficiently secure the display area of the electronic device due to the area occupied by the camera holes.

Meanwhile, the diameters of the camera holes are related to various functions required for the optical lens system. In some optical lens systems, it may be necessary to ensure a camera hole having a predetermined diameter in order to obtain an angle of view higher than a predetermined level. For example, in the case of installing an optical lens system on the front surface of the electronic device for self-photographing of the user, even if an optical module (e.g., a lens assembly) is to be located as close to the front surface of the electronic device as possible in order to ensure a wide angle, it may be difficult to ensure a desired angle of view since it is necessary for the components of the optical module to be located inside the electronic device with respect to a front plate (e.g., a window glass). For example, since the components of the optical module are blocked by the display panel, there may be a limitation in placing the optical module adjacent to the front surface. According to some embodiments, in order to ensure a predetermined angle of view or more, it may be necessary to ensure a camera hole having a diameter of a predetermined size or more. This may conflict with the problem of minimizing the diameters of the camera holes described above.

Certain embodiments are to provide an optical lens system capable of ensuring an angle of view for satisfying an optical performance compared to conventional ones while minimizing the diameters of camera holes and to provide an electronic device including the optical lens system.

In addition, certain embodiments are to provide an optical lens system in which an iris is fixed in order to minimize the size of a camera hole, and only an optical module (e.g., a lens assembly) other than the iris moves in the optical axis direction during auto focusing.

Furthermore, certain embodiments are to provide an optical lens system for preventing a sharp increase in coma aberration around a lens when the iris is located as far away from the object-side as possible with respect to the first lens located on the object-side in the lens assembly.

Moreover, certain embodiments may provide an optical lens system having good optical characteristics while being equipped with a small number of lenses, and an electronic device including the optical lens system.

In the optical lens system according to certain embodiments, the iris is fixed close to the object-side. Thus, the optical lens system is capable of exhibiting a predetermined level or more of optical performance while allowing the camera hole to be formed in a small size.

In addition, the optical lens system according to certain embodiments is capable of preventing coma aberration in the marginal portion of a lens from abruptly increasing, and is capable of having other good optical characteristics.

In addition, according to certain embodiments, since the lens assembly includes a small number of lenses, the size of the lens assembly (e.g., the whole length in the optical axis direction) is reduced so as to enable the lens assembly to be easily mounted in a miniaturized electronic device.

Hereinafter, certain embodiments of the disclosure will be described with reference to the accompanying drawings. In certain embodiments of the disclosure, the expression "configured to" may be interchangeably used with, for example, "suitable for", "having the capacity to", "designed to", "adapted to", "made to", or "capable of" in terms of hardware or software according to situations. In some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to certain embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit). According to some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.). According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In certain embodiments, the electronic device may be flexible, or may be a combination of one or more of the aforementioned various devices. The electronic device according to certain embodiments of the disclosure is not limited to the aforementioned devices. In certain embodiments of the disclosure, the term "user" may refer to a person using an electronic device or a device (e.g., an artificial intelligence electronic device) using an electronic device.

According to certain embodiments described below, a portable electronic device may be described as a representative example of an electronic device. The electronic device may include at least one optical device (hereinafter, referred to as an "optical lens system"), and one optical lens system may be equipped with at least one lens assembly. The following description exemplifies that one lens assembly is mounted in one optical lens system, but it should be noted that this is only one embodiment and is extendable to various other embodiments. In describing certain embodiments, some numerical values or the like may be presented, but it should be noted that such numerical values do not limit the certain embodiments disclosed herein unless described in the claims.

FIG. 1A is a view illustrating the configurations of an optical lens system according to some embodiments and an electronic device 1 including the optical lens system.

The electronic device 1 according to certain embodiments may include a plate 10.

According to certain embodiments, the plate 10 may include a front plate, a rear plate, or a side member of the electronic device 1. For example, the front plate may face a first surface (or a front surface), and the rear plate may face a second surface (or a rear surface) facing away from the first surface. For example, the side member may form a side surface that surrounds the space between the first surface and the second surface, and may form a space capable of accommodating various components constituting the electronic device 1. In certain embodiments, the electronic device can be substantially planar and the side surface can be comparably small in area, and generally having one long dimension and one short dimension. According to an embodiment, at least a portion of the front plate may be substantially transparent. The front plate may correspond to, for example, a glass plate or a polymer plate including various coating layers. According to an embodiment, the rear plate may be a substantially opaque portion. The rear plate may be formed of, for example, coated or colored glass, ceramic, a polymer, a metal (e.g., aluminum, stainless steel (STS), or magnesium), or a combination of at least two of these materials. The side member may be a portion formed by a side bezel structure including a metal and/or a polymer. Hereinafter, in the following description, the plate 10 will be described with reference to the front plate, but it should be noted that the scope of the disclosure is not necessarily limited thereto.

According to certain embodiments, the plate 10 may include a window member 11 and a panel 12.

The window member 11 may be a component that protects the electronic device 1 from external scratches and physical shocks and is at least partially transparent so as to allow some components of the electronic device 1 (e.g., a display screen of a display panel) to be visually recognized from the outside therethrough. The panel 12 may be a display panel. The panel 12 may be exposed through, for example, a large portion of the window member 11. The panel 12 may be coupled to or disposed adjacent to a touch detection circuit, a pressure sensor capable of measuring touch intensity (pressure), and/or a touch panel that detects a magnetic-field-type stylus pen (e.g., a digitizer).

The electronic device 1 may include at least one hole. According to an embodiment, the at least one hole may include a microphone hole in which a microphone for acquiring external sound is disposed, an external speaker hole, or a receiver hole. According to certain embodiments, the at least one hole may be a camera hole 13 corresponding to the optical lens system 20, as described with reference to FIG. 1A.

The camera hole 13 may have a predetermined diameter and may be formed at a position corresponding to the optical module 30 (hereinafter, referred to as a "lens assembly 30") included in the optical lens system 20. According to an embodiment, the camera hole 13 may be disposed on the plate 10.

According to an embodiment, the panel 12 may be located on the rear surface of the window member 11, and may be included in the plate 10. Thereafter, the camera hole 13 provided in the plate 10 may be optically aligned with the lens assembly 30 in the process of assembling the individual components constituting the electronic device 1.

According to certain embodiments disclosed herein, the electronic device 1 may include the optical lens system 20. In this embodiment, the optical lens system 20 may include a lens assembly 30 in which multiple lenses are aligned, optical components, or a lens housing 21 that accommodates the optical components therein.

The lens assembly 30 includes a plurality of lenses aligned therein. According to an embodiment, a front lens 31 is disposed at one end of a lens barrel, and an image or image information may be acquired through the front lens 31 The optical lens system 20 is provided with an iris so as to adjust the brightness of the image or image information by adjusting the amount of light passing through the lenses.

The lens housing 21 may provide a space in which the lens assembly 30 is seated, and the lens assembly 30 may be fixed at a position aligned with the camera hole 13. According to certain embodiments, an image signal processor or various other optical components may be mounted inside the lens housing 21.

Figure 1B:
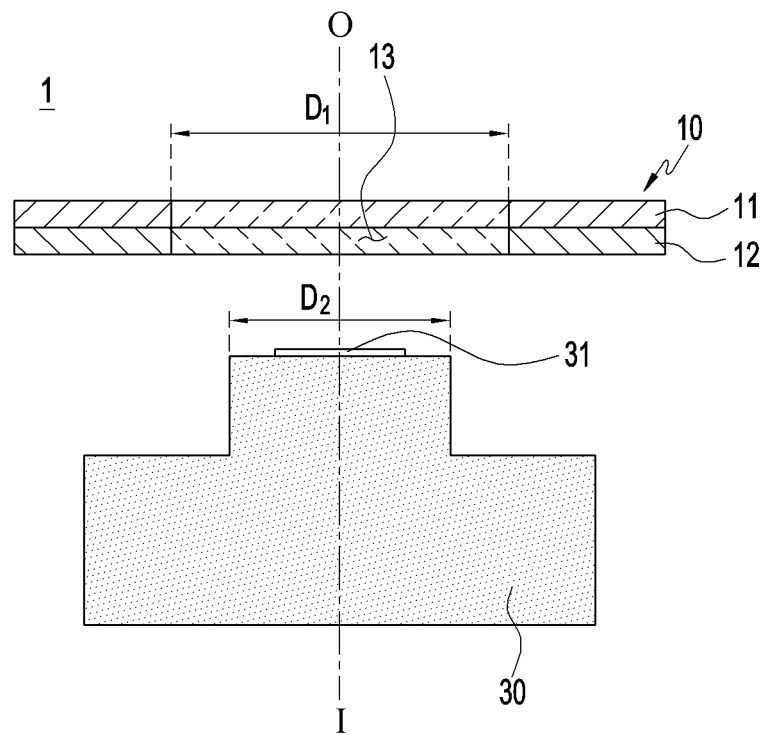
FIG. 1B is a schematic view illustrating the optical lens system illustrated in FIG. 1A and an electronic device including the optical lens system.

FIG. 1B is a view illustrating an optical lens system 20, such as the optical lens system 20 illustrated in FIG. 1A and an electronic device 1 including the optical lens system.

Referring to FIGS. 1A and 1B, in the optical lens system 20 according to some embodiments, the iris may be embedded in the lens assembly 30. The iris may be disposed between two adjacent lenses among the plurality of lenses included in the lens assembly 30. According to one embodiment, when the lens assembly 30 includes six lenses therein including the front lens 31 in the optical axis direction OI, the iris may be disposed between the third and fourth lenses or may be disposed between the second and third lenses. According to another embodiment, the iris may be disposed between the front lens and the second lens. The iris may adjust the amount of light manually by a user's operation using a control panel of the electronic device 10 (which may include virtual keys, the selection of which is detected by a touch sensor) or automatically by an operation of the image signal processor.

Referring to FIGS. 1A and 1B, in the electronic device 1 according to some embodiments, the size D1 of the camera hole 13 may be set to be larger than the diameter D2 of the lens barrel of the optical lens system 20. As another example, the iris may adjust the amount of light manually by a user's operation or automatically by an operation of the image signal processor. The shape of the iris provided in the lens assembly 30 may vary in the operation of adjusting the amount of light, as described above. According to the embodiment of FIGS. 1A and 1B, the position of the iris provided in the lens assembly 30 may move in the optical axis direction, for example, in an auto focusing (AF) operation. According to some embodiments, the size D1 of the camera hole 13 may be set to be larger than the diameter D2 of the lens barrel in consideration of the shapes, movable ranges, or specifications of the lens assembly and the iris mounted in the electronic device 1.

In an embodiment, the optical lens system 20 may have an optical axis O-I from an object (or an external object) side (0) to an image-side (I). The object side can be towards the field of view. The image side can be towards the side receiving the light from the lens assembly 30. In the following description of the configuration of each lens, for example, the object-side may indicate the direction in which an object (or a subject) is located, and the image-side (image-side) may indicate the direction in which an image plane is located.

Figure 2A:
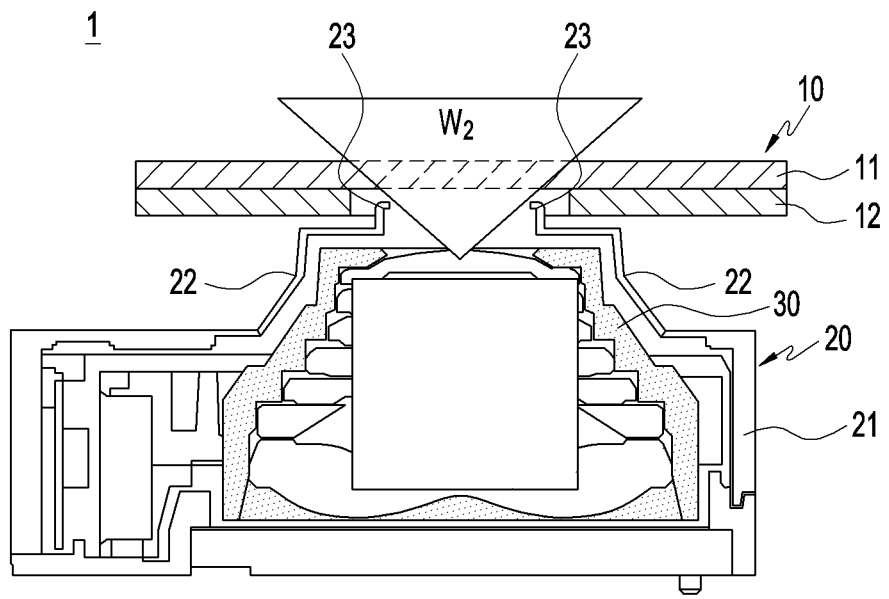
FIG. 2A is a view illustrating the configurations of an optical lens system according to certain embodiments and an electronic device including the optical lens system.

FIG. 2A is a view illustrating the configurations of an optical lens system 20 according to certain embodiments and an electronic device 1 including the optical lens system;

The electronic device 1 according to certain embodiments include an iris 23, a lens assembly 30 movable in the optical axis direction, and/or an image sensor (e.g., an image sensor 180 in FIG. 3 to be described later) configured to form an image of an object to correspond to the lens assembly 30.

In the electronic device 1 of FIG. 2A, the iris 23 may be disposed outside the lens assembly 30. According to the present embodiment, since the iris may be excluded from the inside of the lens assembly 30, it is possible to form a more compact lens assembly 30. When the iris 23 is disposed outside the lens assembly 30, the amount of light that enters the lens assembly 30 may be determined outside the lens assembly 30.

In the embodiment illustrated in FIG. 2A, the position of the iris 23 may be fixed in the electronic device 1. For example, the lens assembly 30 may move in the direction of the optical axis OI, thereby focusing the image formed on the image plane, while the distance between the iris 23 and the image plane may be fixed.

Since the iris 23 is in a fixed position and determines the amount of light from outside that enters the lens assembly 30, it is possible to eliminate other variables that determine the size of the camera hole 13 formed in the plate 10. As a result, since the iris 23 is located outside the lens assembly 30, the size of the camera hole 13 can be reduced.

Figure 2B:
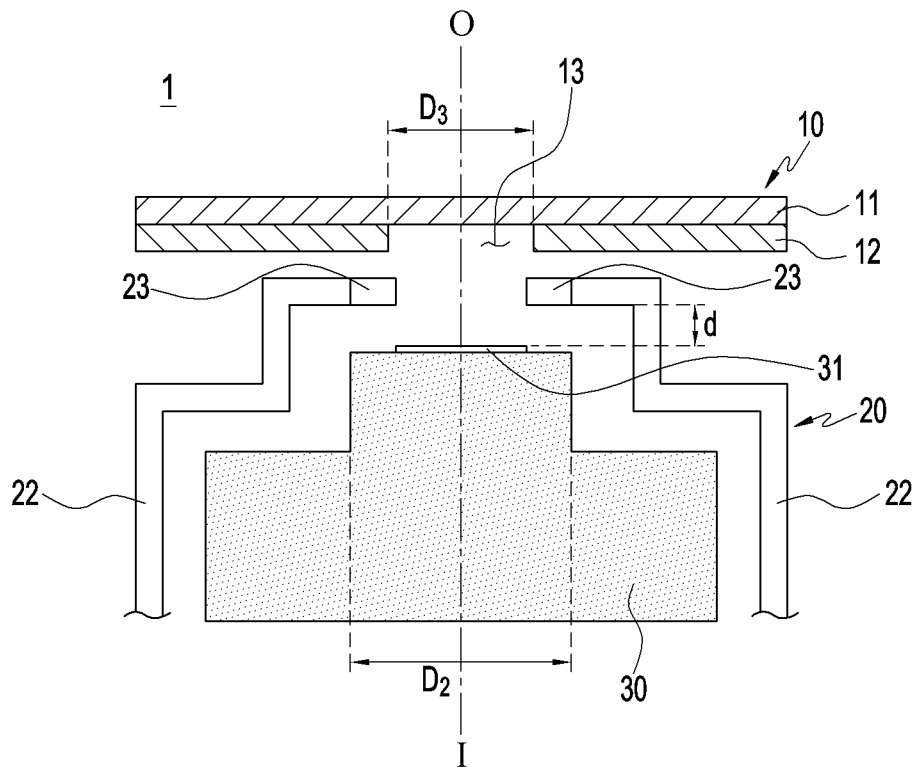
FIG. 2B is a schematic view illustrating the optical lens system illustrated in FIG. 2A and an electronic device including the optical lens system.

FIG. 2B is a schematic view illustrating the optical lens system 20 illustrated in FIG. 2A and an electronic device 1 including the optical lens system.

Referring to FIGS. 2A and 2B, the size of the camera hole 13 in the plate of the electronic device 1 may be reduced compared to the embodiment illustrated in FIGS. 1A and 1B. According to an embodiment, the size D3 of the diameter of the camera hole 13 may be smaller than the size D2 of the diameter of the lens barrel of the lens assembly 30 e.g., D3<D2.

According to certain embodiments, the iris 23 may be disposed at an end of an extension 22. Here, the extension 22 may be a portion manufactured to surround at least a portion of the lens assembly 30.

According to an embodiment, the extension 22 may at least partially extend from the lens housing 21 towards the panel 12 of the plate 10. According to an embodiment, the extension 22 may be bent in a predetermined portion depending on the shape in which the lens barrel protrudes from the lens assembly 30. According to an embodiment, the iris 23 may be disposed at the end of the extension at a position adjacent to the panel 12. According to an embodiment, the extension 22 may be a portion integrally formed from the lens housing 21.

According to another embodiment, the extension 22 may be a portion extending from another fixed structure (e.g., a bracket) or a component disposed in the electronic device 1. For example, the extension 22 may be a portion extending from the bracket on which the optical lens system 20 is mounted so as to surround at least a portion of the lens assembly 30 towards the panel 12 of the plate 10.

According to the embodiment disclosed in FIGS. 2A and 2B, since the position of the iris 23 is fixed and the lens assembly 30 is moved to focus an image formed on the image plane based on the object distance, a mechanism may be used to vary the relative position between the iris 23 and the lens assembly 30. According to an embodiment, the position-fixed iris 23 may be used in the optical lens system 20, in which the lens assembly 30 is movable in the optical axis direction. However, according to another embodiment, the position-fixed iris 23 may be applied even in an embodiment in which the lens assembly 30 does not move in the optical axis direction.

According to certain embodiments, the iris 23 may be disposed at the end of the extension part 22, and may disposed at a position spaced apart from the front lens 31 of the lens assembly 30 by a predetermined distance d. The iris may be disposed closer to the object-side O than the object-side surface of the lens closest to the object-side O (e.g., the front lens 31 in the embodiment of FIG. 2B) on the optical axis O-I. For example, the iris 23 may be designed to be spaced apart from the apex of the object-side surface of the lens closest to the object-side O (e.g., the front lens 31 in the embodiment of FIG. 2B) by at least 0.3 mm on the optical axis.

Figure 2C:
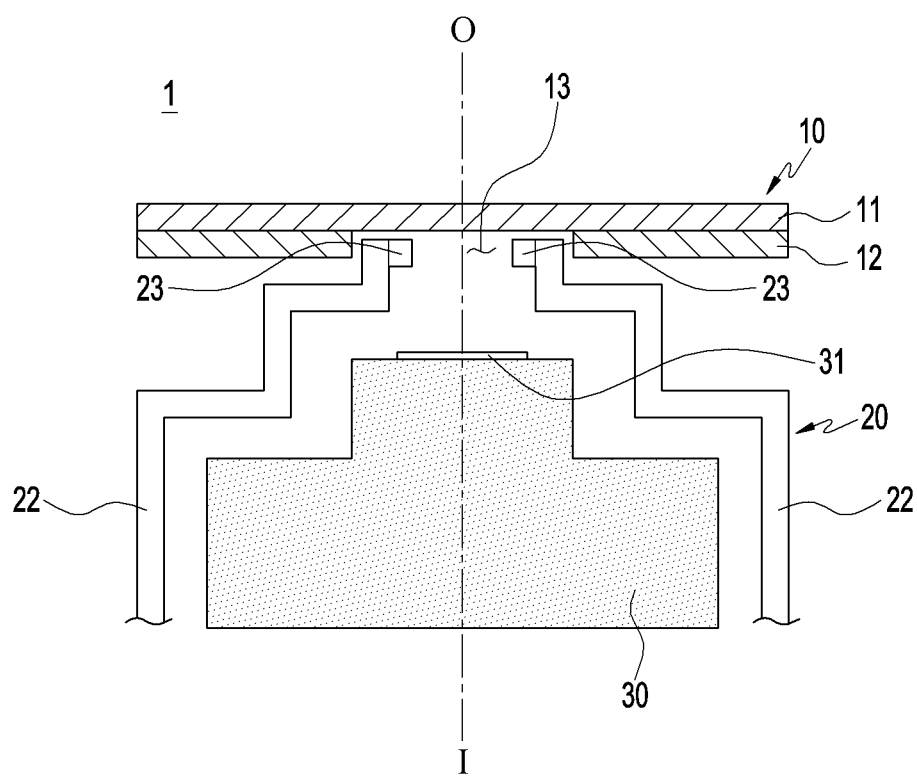
FIG. 2C is a schematic view illustrating an optical lens system different from the optical lens system illustrated in FIG. 2B and an electronic device including the optical lens system.

FIG. 2C is a schematic view illustrating another optical lens system 20.

According to certain embodiments, by positioning the iris 23 as far as possible from the object-side surface of the lens closest to the object-side O (e.g., the front lens 31) on the optical axis within the electronic device 1, size of the camera hole 13 can be reduced.

According to certain embodiments, the camera hole 13 may be formed by drilling at least a portion (e.g., the panel 12) of the plate 10. According to an embodiment, a portion of the panel 12 may be perforated, and the perforated portion may be covered with the window member 11.

Referring to FIGS. 2A and 2C, the iris 23 may be disposed outside the lens assembly 30 and inside the perforated camera hole 13. At least a portion of the iris 23 may be located on the same plane as the panel 12. For example, a line across the iris 23 is between a line across the hole 13 from the bottom of panel 12 and a line across the hole 13 from the top of panel 12. According to certain embodiments, the panel 12 may be rigid, but may be flexible. The wording "at least a portion of the iris 23 is located on the same plane as the panel 12" may mean that in the state in which the panel 12 is fully unfolded, at least a portion of the iris 23 is disposed on the same plane as the unfolded plane of the panel 12 or at least a portion of the iris 23 is disposed to overlap the panel 12 at the same distance (or height) with reference to the distance from the window 10 (or the lens assembly 30). According to certain embodiments, since at least a portion of the iris 23 is located on the same plane as the panel 12, it is possible to reduce the size of the camera hole 13. the Positioning of the iris 23 (which adjusts the amount of entering light) and the window member 11 where the light enters in the camera hole 13 close to each other reduces errors in light adjustment.

According to certain embodiments, Positioning the iris 23 closer to the object-side O than the object-side surface of the lens (the lens closest to the object-side the front lenson the optical axis O-I) advantageously reduce the size of the camera hole 13. However, when the iris is located closer to the object-side O than a designated position, coma aberration in the marginal portion of an image formed on the image plane may be increased, and thus the resolution in the marginal portion may be decreased.

According to certain embodiments, various lens assemblies may be applied in order to prevent the resolution in the marginal portion from being decreased in response to the design of the iris 23.

Hereinafter, various examples of lens assemblies (e.g., lens assemblies 100, 200, 300, 400, 500, and 600) corresponding to the positions of the iris 23 may be described with reference to FIGS. 3 to 26.

In describing the lens assemblies (e.g., the lens assemblies 100, 200, 300, 400, 500, and 600) according to certain embodiments, a side of each lens close to the optical axis O-I may be referred to as a "chief portion", and a further from the optical axis O-I (or near the edge of the lens) may be referred to as a "marginal portion". The chief portion may be, for example, a portion of the front lens 110 intersecting the optical axis OI. The marginal portion may be, for example, a portion of the front lens 110 spaced apart from the optical axis OI by a predetermined distance. The marginal portion may include, for example, an end furthest away from the optical axis O-I of the lens.

Figure 3:
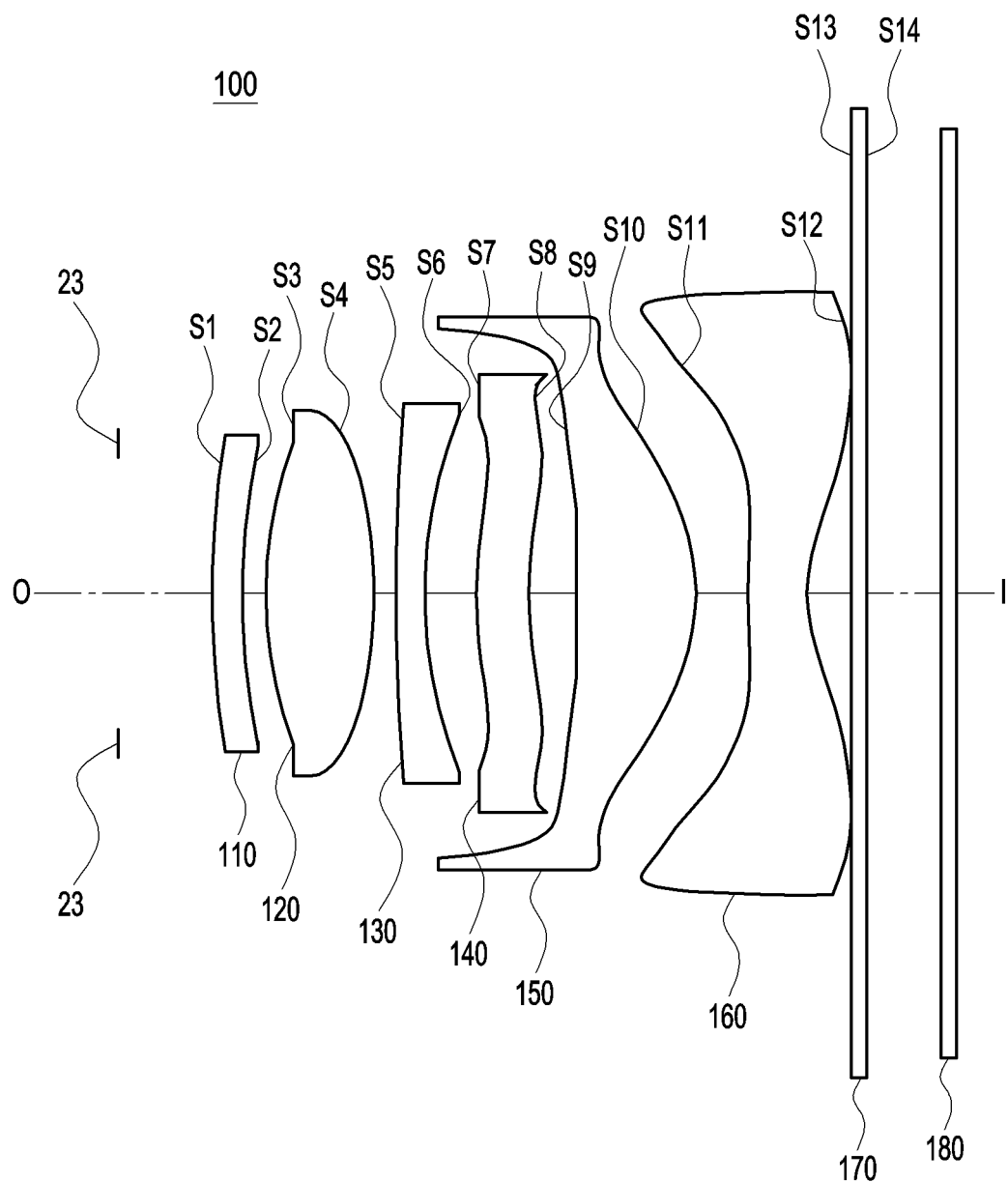
FIG. 3 is a view illustrating the configuration of a lens assembly according to one of certain embodiments.

FIG. 3 is a view illustrating the configuration of a lens assembly 100 (e.g., the lens assembly 30 in FIG. 2A) according to one of certain embodiments.

Referring to FIG. 3, according to one of certain embodiments, the lens assembly 100 may include a plurality of lenses 110, 120, 130, 140, 150, and 160 and/or a filter 170 and/or an image sensor 180.

The "face facing the object-side" may be the lens surface on the side where the object is located with reference to the optical axis O-I, i.e., the left surface (or the front surface) in FIG. 3, and the "face facing the image-side" may be the lens surface on the side that faces the image plane with reference to the optical axis O-I, i.e., the right surface in FIG. 3. The image plane may be, for example, a portion in which an image is formed in the image sensor 180.

In FIG. 3, the first lens includes a surface facing the object-side O, which will now be referred to as a first direction. The first lens includes a surface facing the image-side I, it may be said that the surface facing the image-side I is oriented in a second direction opposite the first direction.

Hereinafter, a plurality of lenses 110, 120, 130, 140, 150, and 160 included in the lens assembly 100 will be described in detail. Here, reference numerals of respective lenses 110, 120, 130, 140, 150, and 160 are merely sequentially given in order to distinguish the lenses in the order in which the lenses are arranged in the optical axis O-I direction for convenience in describing some of certain embodiments. It should be noted that each reference numeral does not indicate the importance of each of the plurality of lenses 110, 120, 130, 140, 150, and 160. Hereinafter, in describing the embodiments of FIGS. 3 to 22, the front lens (e.g., the front lens 110 in FIG. 3 to be described later) may be exemplified as the lens closest to the object-side among the plurality of lenses included in the lens assembly. Unlike this, in describing the embodiments of FIGS. 23 to 26, the first lens (e.g., the first lens 610 in FIG. 23 to be described later) may be exemplified as the lens closest to the object-side among the plurality of lenses included in the lens assembly.

According to certain embodiments, the lens assembly 100 may include, for example, a first lens 120 and a second lens 130 as the plurality of lenses arranged in the optical axis O-I direction (e.g., a direction oriented from the object O toward the image I side in FIG. 1).

According to an embodiment, the lens assembly 100 may further include a front lens 110 located in front of the first lens 120 and located closer to the object-side O than the first lens 120. According to certain embodiments, the lens assembly 100 may further include a third lens 150 and/or a fourth lens 160, as illustrated in FIG. 3. According to another embodiment, the lens assembly 100 may further include a fifth lens 140. For example, the fifth lens 140 may be additionally disposed between the second lens 130 and the third lens 150. The plurality of lenses 110, 120, 130, 140, 150, and 160 described above may be disposed in the state in which the optical axis O-I is aligned with the image sensor 180.

According to certain embodiments, each of the plurality of lenses 110, 120, 130, 140, 150, and 160 may have positive refractive power or a negative refractive power. When light beams parallel to the optical axis O-I are incident on a lens having positive refractive power, the light beams converge. For example, a lens having positive refractive power may be a lens based on the principle of a convex lens. On the contrary, when the parallel light beams are incident on a lens having a negative refractive power, the beams passing through the lens diverge. For example, a lens having negative refractive power may be a lens based on the principle of a concave lens. In the description of the shape of a lens, the convex shape of one surface may mean that the optical axis portion of the surface is convex, and the concave shape of one surface may mean that the optical axis portion of the surface is concave. Accordingly, even if it is described that one surface of a lens has a convex shape, the edge portion of the lens may be concave. Similarly, even if it is described that one surface of a lens has a concave shape, the edge portion of the lens may be convex. In addition, an "inflection point" used in the following detailed description and claims means a point at which a curvature radius is changed in a portion that does not intersect with the optical axis.

According to certain embodiments, the first lens 120 may have positive refractive power. In addition, the second lens 130 may have negative refractive power.

According to certain embodiments, the surface of the first lens 120, which faces the object-side O, may be convex. The surface S6 of the second lens 130, which faces the image-side I, may be concave. According to an embodiment, additionally, the surface S4 of the first lens 120, which faces the image-side I, may be convex, as illustrated in FIG. 3, and the surface S5 of the second lens 130, which faces the object-side O, may be convex.

According to the embodiment illustrated in FIG. 3, in the first lens 120 included in the lens assembly 100, both of the surface S3 facing the object-side O and the surface S4 facing the image-side I may be formed as convex lenses. In the second lens 130, the surface S5, which faces the object-side O, is convex and the surface S6, which faces the image-side I, may include a concavely formed lens. Here, the convexity or the concaveness of each surface of the first lens 120 and the second lens 130 may be variously set according to an embodiment.

According to certain embodiments, by making the first lens 120 and the second lens 130 into lenses having strong refractive power, it is possible to effectively remove coma aberration and astigmatism, which are phenomena in which a distinct image is not formed through a marginal portion of a lens.

According to certain embodiments, in the third lens 150, the surface S10, which faces the image-side I, may be convex. By forming the surface S10 of the third lens 150, which faces the image-side I, to be convex, it is possible to prevent astigmatism around a formed image from increasing and to prevent resolution around the formed image from decreasing. According to an embodiment, in addition to the above-mentioned embodiments, the third lens 150 may have negative refractive power. By providing negative refractive power through the third lens 150 it is possible to effectively compensate for spherical aberration.

According to certain embodiments, in the fourth lens 160, the surface S12, which faces the image-side I, may be convex. According to an embodiment, the angle of a beam reaching the image plane of the image sensor may be set using the fourth lens 160. According to another embodiment, it is possible to appropriately distribute the refractive power to the beams passing through the third lens 150 using the fourth lens 160. According to this, the beams passing through the marginal portion of the lens may be well imaged on the image plane.

In other certain embodiments, the surface S9 of the third lens 150, which faces the object-side O, and the surface S11 of the fourth lens 160, which faces the object-side O, may be convex or concave. As an example, referring to the embodiment illustrated in FIG. 3, in the third second lens 150, the surface S9, which faces the object-side O, may be concave and the surface S10, which faces the image-side I, may be convex, and in the fourth lens 160, the surface S11, which faces the object-side O, and the surface S12, which faces the image-side I, may be concave. According to certain embodiments, the sizes of the third lens 150 and the fourth lens 160 may be relatively larger than the sizes of the first lens 120 and the second lens 130. Compared to the first lens 120 and the second lens 130, the third lens 150 and the fourth lens 160 may be configured to have a relatively large diameter so as to increase a telephoto ratio, and the first lens 120 and the second lens 130 may provide a compact lens assembly by reducing the effective diameter of the lenses.

According to certain embodiments, the lens assembly 100 may include at least four lenses including the first lens 120, the second lens 130, the third lens 150, and the fourth lens 160. According to an embodiment, the first lens 120 and the second lens 130 may be used to determine the F number, angle of view, or size of the lens assembly 100. According to an embodiment, by including the third lens 150 and the fourth lens 160, it is possible to correct various optical aberrations (e.g., chromatic aberration, image curvature aberration, spherical aberration, coma aberration, or astigmatism) of the lens assembly 100.

According to certain embodiments, the lens assembly 100 may additionally include the front lens 110 in front of the first lens 120 and the second lens 130. In addition, by providing positive refractive power via the additionally provided front lens 110, it is possible to increase the resolution of an image or a video imaged by beams passing through the marginal portion of the lens, and it is possible to ensure a telephoto ratio for implementing a function as a telephoto lens assembly by reducing the movement path of beams. According to an embodiment, the front lens 110 located in front of the first lens 120 may provide a more compact lens assembly by reducing the effective diameter thereof.

According to certain embodiments, the lens assembly 100 may additionally include a fifth lens 140 between the second lens 130 and the third lens 150. In the fifth lens 140, the surface S7, which faces the object-side O, and the surface S8, which faces the image-side I, may be convex or concave. FIG. 3 illustrates that, in the fifth lens 140, the surface S7, which faces the object-side O, is convex and the surface S8, which faces the image-side I, is concave, but is not necessarily limited thereto. The lens assembly 100 is capable of correcting the optical aberration thereof more precisely by additionally including the fifth lens 140.

For example, chromatic aberration and image curvature aberration may be corrected through the third lens 150, the fourth lens 160, or the fifth lens 140.

As described above, when one surface of a lens is convex or concave, it may mean that the chief portion of the lens placed on the optical axis (II is convex or concave. According to an embodiment, even if the chief portion of a lens may be concave, the marginal portion of the lens may be convex. For example, as illustrated in FIG. 3, when the surface S12 of the fourth lens 160, which faces the image-side I, is concave, the chief portion of the surface S12 of the fourth lens 160, which faces the image-side I is concave, but the marginal portion of the surface S12 of the fourth lens 160, which faces the image-side I, may be convex.

According to certain embodiments, at least one of the first to fifth lenses 120, 130, 140, 150, and 160 may be formed as an aspherical lens. The aspherical lens may be a lens having an inflection point. The inflection point may refer to, for example, a point where the symbol of a curvature radius is changed from positive (+) to negative (−) or from negative (−) to positive (+). Alternatively, the inflection point may refer to, for example, a point where the shape of the surface of at least one side of a lens is changed from convexity to concavity or from concavity to convexity. The radius of curvature may refer to a degree of curvature at each point of, for example, a curved surface or a curve. It may be possible to prevent image curvature by forming at least one of the third to fifth lenses 140, 150, and 160 as an aspherical lens. For example, in the state in which the chief portion of the surface S12 of the fourth lens 160, which faces the image-side I, is concave, the marginal portion of the fourth lens 160, which faces the image-side I, may have a convex shape. By forming one surface of the fourth lens 160 (e.g., the surface S12, which faces the image-side I) as an aspherical surface, it is possible to precisely set the angle of beams entering the image sensor.

The image sensor 180 is a sensor mounted on a circuit board (not illustrated) and arranged in the state of being aligned with the optical axis O-I, and may respond to light. The image sensor 180 may include, but is not limited to, a sensor, such as a complementary metal oxide semiconductor (CMOS) image sensor or a charge coupled device (CCD). As a non-limiting example, image sensor 180 may include various elements that convert light, for example, a subject image, into an electric image signal. The image sensor 180 may detect contrast information, gradation ratio information, or color information on a subject from light passing through the plurality of lenses 110, 120, 130, 140, 150, and 160 so as to acquire an image of the subject.

The lens assembly 100 may further include a filter 170 disposed between the fourth lens 160 and the image sensor 180. The filter 170 may block light (e.g., infrared rays) detected by a film or an image sensor of an optical device. The filter 170 may include at least one of, for example, an optical filter, or a cover glass. For example, when the filter 170 is mounted, the color sense of an image detected and photographed through the image sensor 180 may be made to be similar to the color sense felt by a human when viewing an actual object. In addition, the filter 170 transmits visible rays and allows infrared rays to be discharged to the outside such that the infrared rays may be prevented from being transferred to the image plane of the image sensor 180.

Furthermore, the electrical signal output by the image sensor 180 may represent the light as a set of pixels encoding color components of each position of the image.

According to certain embodiments, the lenses of the lens assembly 100 may include at least one plastic injection-molded lens. For example, the plastic injection-molded lens may be an aspheric lens. Through the combination of the lenses, the lens assembly 100 may have a wide angle of view (e.g., an angle of view of about 70 degrees or more).

The narrower the distance between one lens and another adjacent lens allows the length of the lens assembly 100 (the total length of the lens assembly in the optical axis direction) to be shortened. For example, when it is desired to reduce the size of the optical lens system (e.g., the optical lens system 20 of FIG. 2A) and/or an electronic device (e.g., the electronic device 1 of FIG. 2A) including a lens assembly 100 according to certain embodiments, it is advantageous to keep the overall length of the lens assembly 100 as short as possible. However, there may be physical limitations in shortening the overall length of the lens assembly 100 in the state in which a proper telephoto ratio is ensured. The spacing of the plurality of lenses 110, 120, 130, 140, 150, and 160 may be set depending on desired optical characteristics (e.g., aberration characteristics, wide angle characteristics, and/or brightness characteristics) for the lens assembly 100.

According to certain embodiments, the lens assembly 100 described above satisfies the following Equations 1 and 2. The foregoing may provide a compact optical lens system having good optical characteristics (e.g., the optical lens system 20 in FIG. 2A).

$$1.1 \leq \frac{STL}{TL} \leq 1.5 \qquad \text{[Equation 1]}$$

$$0.2 \leq \frac{S1}{EPD} \leq 1.0 \quad \text{[Equation 2]}$$

STL is the distance on the optical axis from the iris to the image plane of the image sensor, TL is the distance on the optical axis from the apex of the lens (e.g., the front lens 110) closest to the object-side among the plurality of lenses included in the lens assembly to the image plane.

EPD is the diameter of the entrance pupil of the optical lens system 20,

S1 is the distance from the iris 23 to the lens closest (e.g., the front lens 110) to the object-side among the plurality of lenses included in the lens assembly.

Equation 1 may mean that the distance from the iris to the image plane exceeds the distance from the surface S1 of the front lens 110, which faces the object-side, to the image plane.

By keeping below the upper limit of Equation 1, e.g., 1.5, the iris 23 is located near enough toward the image-side (e.g., the second direction) relative to the object-side surface S1 of the front lens 110, preventing excessive coma aberration degradation of resolution in a marginal portion. Keeping above the lower limit of [Equation 1], e.g., 1.1, ensures that the position of the iris 23 is located closer than a designated distance on the object-side than the front lens 110, ensuring an effective distance for reducing the size of the camera hole.

Equation 2 may be an expression that defines the size of an incident pupil. For example, the distance S1 from the iris 23 to the first lens 120 included in Equation 2 may have a value of 0.3 mm or more. Keeping below the upper limit of Equation 2 ensures that the size of the incident pupil is sufficient, preventing low brightness (e.g., F-number may result in small) and ensures optical performance at low illumination. By keeping above the lower limit of [Equation 2], the distance between the position of the iris 23 and the object-side surface S1 of the front lens is sufficient, ensure an effective distance for reducing the size of the camera hole.

According to certain embodiments, the position of the iris 23 may be located outside the lens assembly 100 while satisfying Equations 1 and 2, for example, closer to the object-side than the lens closest to the object-side in the lens assembly 100. Through the foregoing, it is possible to remove the iris from the lens assembly 100, thereby improving the compactness of the optical lens system (e.g., the optical lens system 20 in FIG. 2A) and/or the electronic device (e.g., the electronic device 1 in FIG. 2A) and reducing the size of the camera hole in the optical lens system (e.g., the optical lens system 20 in FIG. 2A) and/or the electronic device (e.g., the electronic device 1 in FIG. 2A) including the lens assembly 100.

According to certain embodiments, the lens assembly 100 may additionally satisfy Equation 3 below:

$$0.7 \leq \frac{EPD}{Y1} \leq 1.0 \quad \text{[Equation 3]}$$

Here, Y1 is the effective diameter of the lens closest to the object-side (e.g., the front lens 110) among the plurality of lenses included in the lens assembly. Equation 3 may be an expression that defines the size of the front lens 110. When keeping below the upper limit of Equation 3, e.g., 1.0, the front lens 110 is sufficient size to prevent the coma aberration in the marginal portion. In contrast, by keeping above the lower limit of Equation 3, 0.7, the size of the front lens 110 is small enough to reduce the effective barrel size, thereby sufficiently reducing the size of the camera hole.

According to certain embodiments, the lens assembly 100 may additionally satisfy Equation 4 below:

$$1.5 \leq \frac{STL}{Y_{1H}} \leq 2.5 \quad \text{[Equation 4]}$$

Here, STL represents the distance from the iris to the image plane on the optical axis, and $Y_{1H}$ represents the height of the image plane.

Equation 4 may define an optimal value of the ratio of the distance from the iris 23 to the image plane on the optical axis and the height of the image plane. Keeping below the upper limit of Equation 4, e.g., 2.5, allows sufficient reduction in the size of the electronic device 1 by keeping the electronic device 1 reasonably thin. Keeping above the lower limit of Equation 4, e.g., 1.5, the position of the iris 23 is sufficiently spaced apart from the lens closest to the object-side (e.g., the front lens 110) among the plurality of lenses included in the lens assembly, allowing reduction of the size of the camera hole.

According to certain embodiments, the lens assembly 100 may additionally satisfy Equation 5 below:

$$0.1 \leq \frac{S1}{Y_{1H}} \leq 1.0 \quad \text{[Equation 5]}$$

Here, S1 may represent the distance from the iris to the lens closest to the object-side (e.g., the front lens 110) among the plurality of lenses included in the lens assembly, and $Y_{1H}$ may represent the height of the image plane. Equation 5 may define an optimal value of the ratio of the distance from the iris 23 to the front lens 110 on the optical axis and the height of the image plane. By keeping below the upper limit of Equation 5, e.g., 1.0, the position of the iris 23 in the lens assembly 100 allows sufficient ambient light, preventing coma aberration in the marginal portion, while allowing sufficient resolution in the marginal portion. By keeping above the lower limit of Equation 5, the position of the iris 23 is sufficiently spaced apart from the front lens 110 allowing a reduction to the size of the camera hole.

According to certain embodiments, the lens assembly 100 may additionally satisfy Equation 6 below.

$$1.65 < N2 \quad \text{[Equation 6]}$$

Here, N2 may be the refractive index of a second lens 130, in which the surface, which faces the image-side, is concave and has negative refractive power. Equation 6 may be an expression that defines the refractive index of the second lens 130. In order to suppress coma aberration in the marginal portion generated as the iris moves farther away from the object-side surface S1 of the front lens 110 towards the object-side, a lens of a high-refractive material having strong refractive power may be required. Keeping above the lower limit of Equation 6, allows sufficient coma aberration suppression.

According to certain embodiments, the lens assembly 100 may additionally satisfy Equation 7 below:

$$1.2 \leq \frac{f}{|f\max|} \leq 2.0 \quad \text{[Equation 7]}$$

Here, f represents a composite focal length of the optical lens system, and fmax represents a focal length of a lens having the strongest refractive power among the plurality of lenses. Equation 7 may define the ratio of the focal length of the lens having the strongest power to the entire focal length of the lens assembly. By keeping below the upper limit of Equation 7, e.g. 2.0, the refractive power of the lens is controlled to allow correction of spherical aberration. By keeping above the lower limit of Equation 7, e.g., 1.2, the refractive power of the lens is sufficient allowing coma aberration correction and reduction in size of the optical lens system (e.g., the optical lens system 20 in FIG. 2A).

Equations 1 to 3 and Equation 5 are described with reference to the lens closest to the object-side (e.g., the front lens 110) among the plurality of lenses included in the lens assembly. However, it should be noted that when the lens assembly 100 does not include the front lens 110, the values for the first lens 120 may be used.

Table 1 below shows various lens data of the lens assembly 100, and "S1 to S14" represent the surfaces of the plurality of related lenses 110, 120, 130, 140, 150, and 160 and or the surface of the filter 170. "Radius" represents the radius of curvature of a lens, "Thick" represents the thickness or air gap of a lens, "H-Ape" represents the radius of a lens, "EFL" represents the focal length of a lens, and "nd" represents the refractive index of a medium (e.g., lens). The lens assembly 100 included in Table 1 may have an F-number (F-No) of 1.89, an angle of view (ANG) of 76 degrees, a composite focal length (EFL) of 3.67 mm, and an image plane height ($Y_{1H}$) of 2.884 mm, and may satisfy at least one of the above-described conditions. The values in Table 1 are only for certain embodiments, and other embodiments may use different values.

The drawings according to certain embodiments included in this specification may be shown to be different from the data in the following tables due to the circumstances of the drawing program, in which case the criteria may follow the tables below.

TABLE 1

| Surface | Radius (mm) | Thickness (mm) | H-Ape | EFL (mm) | nd |
|---|---|---|---|---|---|
| obj | infinity | Infinity | | | |
| Stp (23) | infinity | 0.6679 | 0.97 | | |
| S1* | 4.754 | 0.22 | 1.03 | −61.8892 | 4.67074 |
| S2* | 4.191 | 0.152 | 1.03 | | |
| S3* | 2.319 | 0.762 | 1.08 | 3.3485 | 1.5441 |
| S4* | −7.671 | 0.163 | 1.2 | | |
| S5* | 21.738 | 0.217 | 1.24 | −6.9926 | 1.67074 |
| S6* | 3.881 | 0.357 | 1.24 | | |
| S7* | 2.573 | 0.367 | 1.29 | −843.625 | 1.67074 |
| S8* | 2.414 | 0.337 | 1.42 | | |
| S9* | −62.362 | 0.854 | 1.52 | 2.5427 | 1.5441 |
| S10* | −1.366 | 0.377 | 1.65 | | |
| S11* | 4.729 | 0.407 | 1.86 | −2.3792 | 1.5348 |
| S12* | 0.946 | 0.32 | 2.49 | | |
| S13 | infinity | 0.11 | 2.65 | | 1.5168 |
| S14 | infinity | 0.54154 | 2.68 | | |
| img | infinity | −0.00159 | | | |

Tables 2 and 3 below show aspherical coefficients of the plurality of lenses 110, 120, 130, 140, 150, and 160, in which the aspherical coefficients may be calculated through Equation 8 below:

$$x = \frac{cy^2}{1 + \sqrt{1 - (K+1)c^2 y^2}} + Ay^4 + By^6 + Cy^8 + Dy^{10} + \ldots \quad \text{[Equation 8]}$$

Here, "x" represents the distance from the apex of a lens in the optical axis (O-I) direction, "c" represents a basic curvature of a lens, "y" represents the distance in the direction perpendicular to the optical axis, "K" represents a conic constant, and "A", "B", "C", "D", "E", and "F" represent aspherical coefficients, respectively.

TABLE 2

| Surf | S1 | S2 | S3 | S4 | S5 | S6 |
|---|---|---|---|---|---|---|
| K (Conic) | −48.62116087 | −5.05E+01 | −8.56E+00 | 1.03E+01 | −1.05E+02 | 5.37E+00 |
| A (4th) | 0.002465064 | 7.86E−03 | 3.78E−02 | −3.44E−02 | 3.61E−03 | −2.02E−02 |
| B (6th) | −0.005866791 | −3.33E−02 | −1.69E−02 | −1.90E−02 | −1.71E−02 | 2.35E−02 |
| C (8th) | −0.029961667 | 9.13E−02 | 2.67E−03 | 3.95E−02 | −8.43E−03 | −6.50E−02 |
| D (10th) | 0.070108264 | −1.97E−01 | 2.21E−03 | −1.38E−01 | 1.52E−02 | 6.91E−02 |
| E (12th) | −0.06813559 | 3.00E−01 | −6.36E−02 | 2.41E−01 | 4.34E−02 | −1.98E−02 |
| F (14th) | 0.035166637 | −2.76E−01 | 1.06E−01 | −2.29E−01 | −6.82E−02 | −1.20E−02 |
| G (16th) | −0.006546335 | 1.43E−01 | −7.11E−02 | 1.10E−01 | 3.54E−02 | 9.99E−03 |
| H (18th) | 0 | −3.13E−02 | 1.61E−02 | −2.18E−02 | −6.54E−03 | −2.26E−03 |
| J (20th) | 0 | 0.00E+00 | 0.00E+00 | 0.00E+00 | 0.00E+00 | 0.00E+00 |

TABLE 3

| Surf | S7 | S8 | S9 | S10 | S11 | S12 |
|---|---|---|---|---|---|---|
| K (Conic) | −0.158097235 | −2.010362 | −1 | −4.410968 | −8.761505 | −3.38196 |
| A (4th) | −0.142787108 | −0.117573 | 0.0070627 | −0.042972 | −0.247048 | −0.20438 |
| B (6th) | 0.036342935 | −0.023553 | −0.096009 | −0.052761 | 0.0202323 | 0.156655 |
| C (8th) | −0.033562033 | 0.0881416 | 0.0667001 | 0.093175 | 0.1626525 | −0.08449 |
| D (10th) | 0.05614674 | −0.091208 | −0.005473 | −0.082033 | −0.195844 | 0.031724 |
| E (12th) | −0.081580669 | 0.0468777 | −0.018899 | 0.042373 | 0.1243399 | −0.00829 |
| F (14th) | 0.050304497 | −0.011731 | 0.0182268 | −0.009211 | −0.048841 | 0.001461 |
| G (16th) | −0.010373266 | 0.0012889 | −0.008854 | −0.000564 | 0.0117942 | −0.00017 |
| H (18th) | 0 | 0 | 0.0021698 | 0.000541 | −0.001593 | 1.08E−05 |
| J (20th) | 0 | 0 | −0.000211 | −6.05E−05 | 9.16E−05 | −3.12E−07 |

Figure 4:
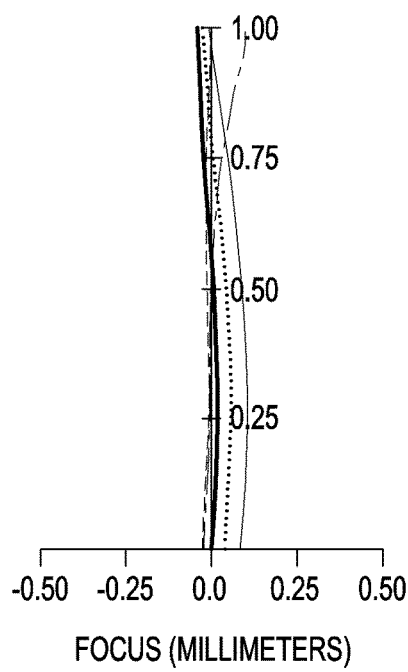
FIG. 4 is a graph illustrating spherical aberration.

FIG. 4 is a graph illustrating spherical aberration of the lens assembly 100 according to one of certain embodiments. The spherical aberration may be a phenomenon in which the focusing positions of the beams passing through different portions of the lens (e.g., the chief portion and the marginal portion) become different from each other.

In FIG. 4, the horizontal axis represents a degree of longitudinal spherical aberration, and the vertical axis represents a normalized distance from the center of the optical axis, in which changes in longitudinal spherical aberration depending on the wavelengths of beams are represented. Longitudinal spherical aberration may be represented for each of beams having wavelengths of, for example, 656.2725 nm (nanometer), 587.5610 nm, 546.0740 nm, 486.1327 nm, and 435.8343 nm, respectively.

Figure 5:
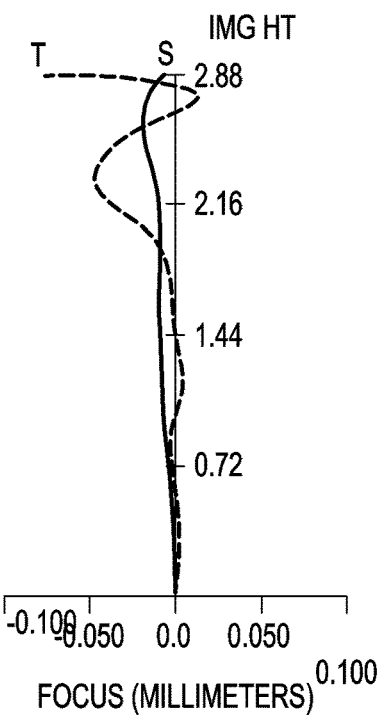
FIG. 5 is a graph illustrating astigmatism of the lens assembly illustrated in FIG. 4.

FIG. 5 is a graph illustrating astigmatism of the lens assembly 100 according to one of certain embodiments. The astigmatism may be a phenomenon in which when the tangential plane or the meridian plane and the sagittal plane of a lens have different radii, the focal points of beams passing in the vertical line and the horizontal line are shifted from each other.

In FIG. 5, the astigmatism of the lens assembly 100 is a result obtained at a wavelength of 546.074 nm. In FIG. 5, the solid line represents astigmatism in a tangential direction (e.g., a tangential field curvature), and the dot line represents astigmatism in a sagittal direction (e.g., a sagittal plane curvature).

Figure 6:
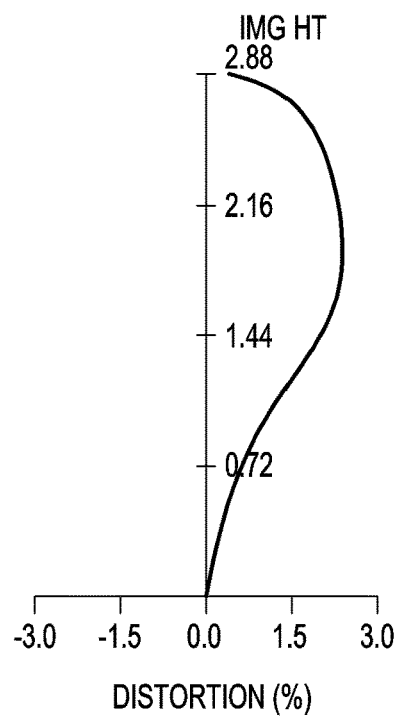
FIG. 6 is a graph illustrating distortion aberration of the lens assembly illustrated in FIG. 4.

FIG. 6 is a graph illustrating distortion aberration of the lens assembly 100 according to one of certain embodiments disclosed herein. The distortion aberration occurs because the optical magnification varies depending on the distance from the optical axis O-I, and in theory, an image formed on the actual image plane may appear larger or smaller than the image formed on the image plane.

In FIG. 6, the distortion of the lens assembly 100 is a result obtained at a wavelength of 546.0740 nm, and an image captured through the lens assembly 100 may be somewhat distorted at a point away from the optical axis O-I. However, such a distortion is a degree that may generally occur in an optical device that uses a lens, and as the distortion rate is less than 3%, it is possible to provide a good optical characteristic.

Figure 7:
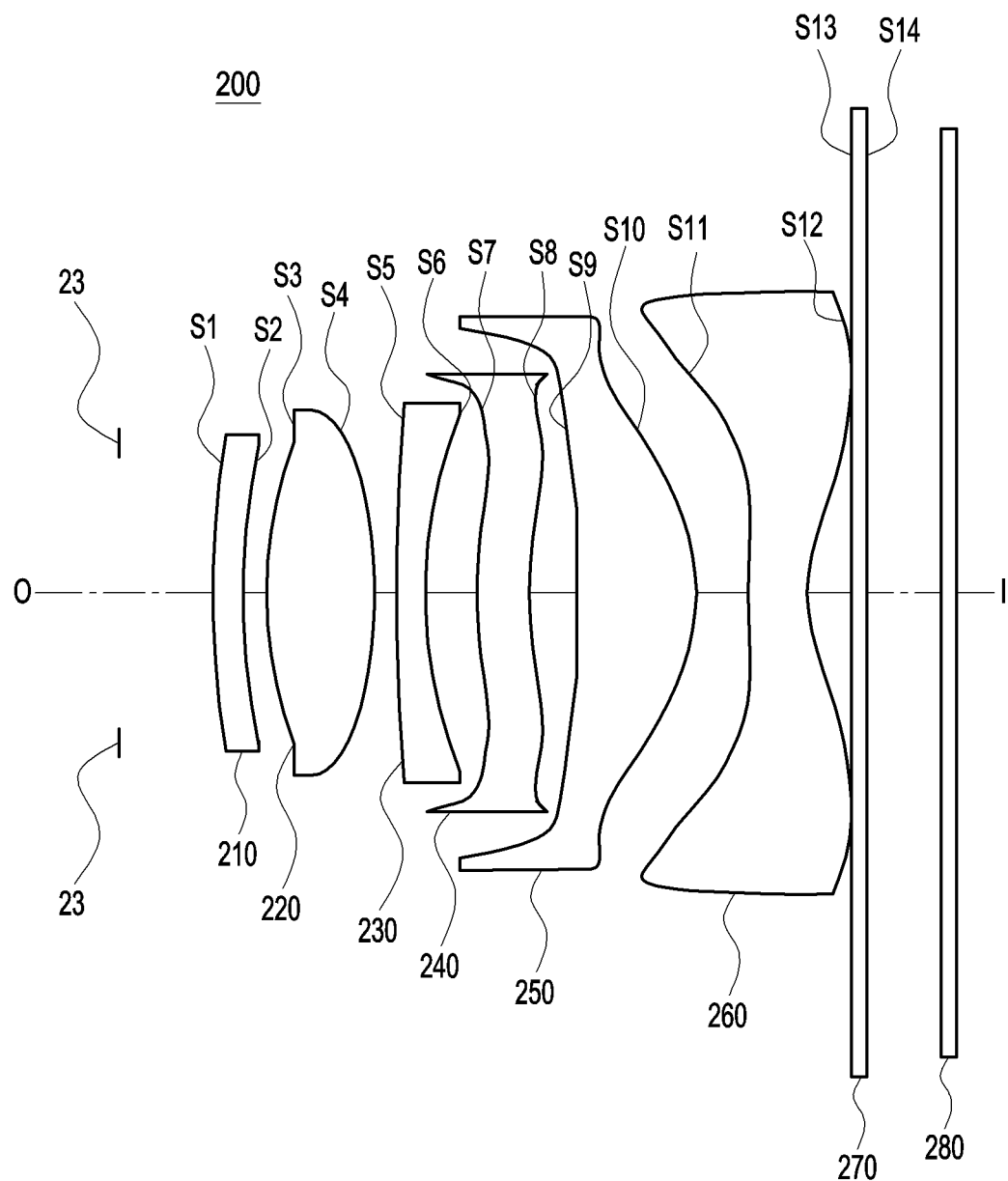
FIG. 7 is a view illustrating the configuration of a lens assembly according to another one of certain embodiments.
Figure 8:
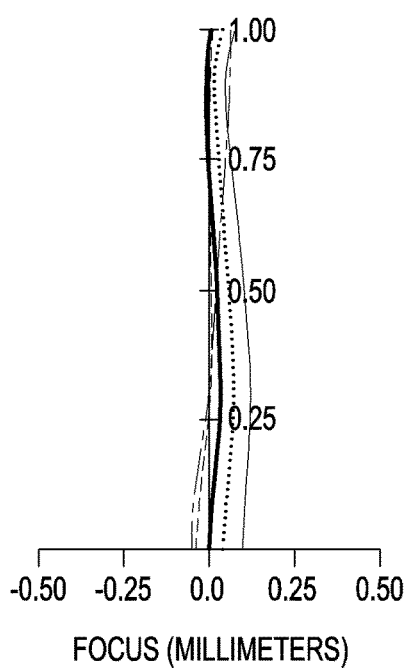
FIG. 8 is a graph illustrating spherical aberration of the lens assembly illustrated in FIG. 7.
Figure 9:
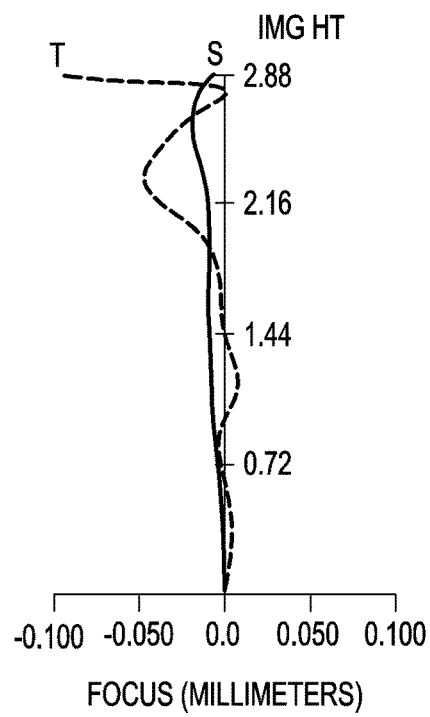
FIG. 9 is a graph illustrating astigmatism of the lens assembly illustrated in FIG. 7.
Figure 10:
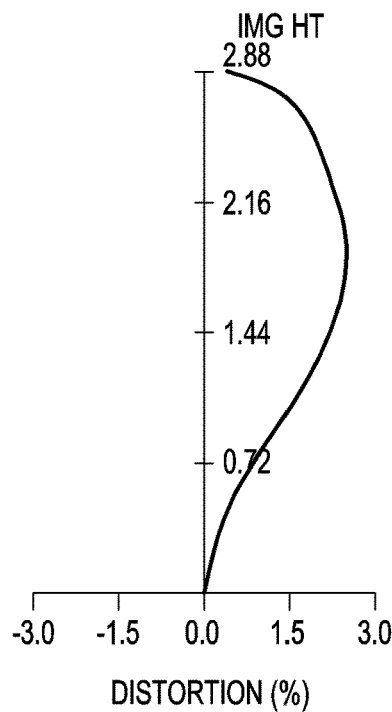
FIG. 10 is a graph illustrating distortion aberration of the lens assembly illustrated in FIG. 7.

FIG. 7 is a view illustrating the configuration of a lens assembly 200 according to another one of certain embodiments. FIG. 8 is a graph illustrating spherical aberration of the lens assembly 200 illustrated in FIG. 7. FIG. 9 is a graph illustrating astigmatism of the lens assembly 200 illustrated in FIG. 7. FIG. 10 is a graph illustrating distortion aberration of the lens assembly 200 illustrated in FIG. 7.

In describing certain embodiments below, the components that can be easily understood through the above-described embodiments may be denoted by similar reference numerals or the reference numerals may be omitted. In addition, redundant detailed descriptions thereof may be omitted.

Referring to FIGS. 7 to 10, a lens assembly 200 according to an embodiment different from the embodiment of FIG. 3 among certain embodiments disclosed herein may include a plurality of lenses 210, 220, 230, 240, and 250, an image sensor 280, and/or a filter 270.

According to certain embodiments, the lens assembly 200 may include a first lens 220 (e.g., the first lens 120 in FIG. 3), a second lens 230 (e.g., the second lens 130 in FIG. 3), a third lens 250 (e.g., the third lens 150 in FIG. 3), and a fourth lens 260 (e.g., the fourth lens 160 in FIG. 3). As another example, the lens assembly 200 may include a front lens 210 (e.g., the front lens 110 in FIG. 3) and/or a fifth lens 240 (e.g., the fifth lens 140 in FIG. 3).

Referring to FIGS. 3 and 7, the diameter of the fifth lens 240 illustrated in FIG. 7 may be larger than that of the fifth lens 140 illustrated in FIG. 3. For reference, in describing the lens assembly 200 according to certain embodiments, the marginal portion of each lens is illustrated in the drawing as extending in the direction of the optical axis O-I in order to conceptually represent that the diameter of the corresponding lens is large.

Table 4 below shows various lens data of the lens assembly 200 according to the embodiment of FIG. 7. Tables 5 and 6 below show aspherical coefficients of the plurality of lenses 210, 220, 230, 240, 250, and 260. Here, the lens assembly 200 may have an F-number (F-No) of 1.9, an angle of view (ANG) of 76 degrees, a composite focal length (EFL) of 3.68 mm, and an image plane height ($Y_{1H}$) of 2.884 mm, and may satisfy at least one of the above-described conditions.

TABLE 4

| Surf | Radius (mm) | Thick (mm) | H-Ape | EFL (mm) | nd |
|---|---|---|---|---|---|
| obj | infinity | infinity | | | |
| Stp (23) | infinity | 0.66794 | 0.97 | | |
| S1* | 4.407 | 0.22 | 1.03 | −71.673 | 1.5441 |
| S2* | 3.891 | 0.153 | 1.03 | | |
| S3* | 2.308 | 0.762 | 1.08 | 3.2784 | 1.5441 |
| S4* | −7.076 | 0.126 | 1.2 | | |
| S5* | 28.319 | 0.217 | 1.23 | −6.6095 | 1.67074 |
| S6* | 3.861 | 0.372 | 1.24 | | |
| S7* | 2.582 | 0.37 | 1.29 | −221.727 | 1.67074 |
| S8* | 2.391 | 0.342 | 1.41 | | |
| S9* | −128.516 | 0.854 | 1.53 | 2.6037 | 1.5441 |
| S10* | −1.411 | 0.399 | 1.66 | | |
| S11* | 4.447 | 0.399 | 1.87 | −2.4496 | 1.5348 |
| S12* | 0.983 | 0.318 | 2.5 | | |
| S13 | infinity | 0.11 | 2.65 | | 1.5168 |
| S14 | infinity | 0.53935 | 2.68 | | |
| img | infinity | 0.00078 | | | |

TABLE 5

| Surf | S1 | S2 | S3 | S4 | S5 | S6 |
|---|---|---|---|---|---|---|
| K (Conic) | −48.13779485 | −5.06E+01 | −8.57E+00 | 1.06E+01 | −1.00E+00 | 5.39E+00 |
| A (4th) | 0.005624752 | 1.10E−02 | 3.48E−02 | −3.50E−02 | 3.39E−03 | −1.95E−02 |
| B (6th) | −0.016361085 | −5.44E−02 | −3.33E−03 | −1.81E−02 | −1.97E−02 | 2.26E−02 |
| C (8th) | −0.024762142 | 1.50E−01 | −2.77E−02 | 4.18E−02 | 7.40E−03 | −6.39E−02 |
| D (10th) | 0.084854424 | −3.12E−01 | 3.40E−02 | −1.49E−01 | −3.27E−02 | 6.47E−02 |
| E (12th) | −0.10514034 | 4.70E−01 | −5.64E−02 | 2.60E−01 | 1.20E−01 | −9.37E−03 |
| F (14th) | 0.080606831 | −4.42E−01 | 5.55E−02 | −2.47E−01 | −1.36E−01 | −2.36E−02 |
| G (16th) | −0.040700137 | 2.38E−01 | −2.70E−02 | 1.20E−01 | 6.64E−02 | 1.62E−02 |
| H (18th) | 0.016881332 | −5.46E−02 | 3.76E−03 | −2.39E−02 | −1.23E−02 | −3.60E−03 |
| J (20th) | −0.00444757 | 0.00E+00 | 0.00E+00 | 0.00E+00 | 0.00E+00 | 0.00E+00 |

TABLE 6

| Surf | S7 | S8 | S9 | S10 | S11 | S12 |
|---|---|---|---|---|---|---|
| K (Conic) | −0.199211144 | −1.980294252 | −1 | −4.447119211 | −9.706710994 | −3.365321453 |
| A (4th) | −0.142500909 | −0.117437993 | 0.004654438 | −0.044921005 | −0.258723285 | −0.200857984 |
| B (6th) | 0.031268373 | −0.023428963 | −0.084056393 | −0.036361881 | 0.05951648 | 0.152532212 |
| C (8th) | −0.02445698 | 0.086280467 | 0.057888049 | 0.064760112 | 0.092255906 | −0.083395375 |
| D (10th) | 0.044806127 | −0.089189312 | −0.019979859 | −0.055946991 | −0.128375668 | 0.032175835 |
| E (12th) | −0.072036914 | 0.047364324 | 0.011480685 | 0.026087537 | 0.085757601 | −0.008666627 |
| F (14th) | 0.045848955 | −0.012854709 | −0.004933953 | −0.00209912 | −0.035016552 | 0.001574984 |
| G (16th) | −0.009515713 | 0.001593421 | 0.000161331 | −0.002549788 | 0.008734488 | −0.000182968 |
| H (18th) | 0 | 0 | 0.000387945 | 0.000849258 | −0.001210349 | 1.23E−05 |
| J (20th) | 0 | 0 | −6.89E−05 | −8.04E−05 | 7.09E−05 | −3.61E−07 |

Figure 11:
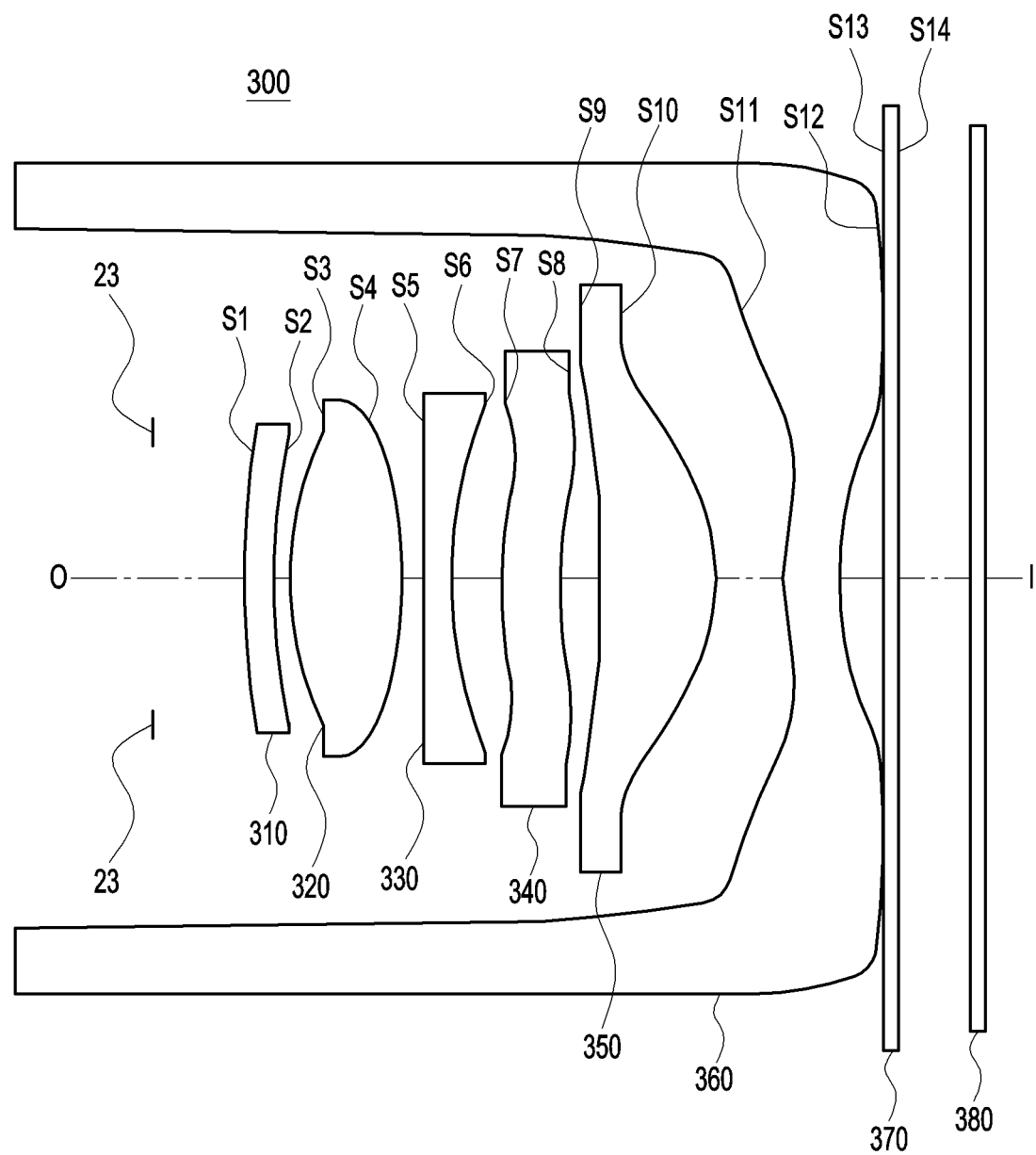
FIG. 11 is a view illustrating the configuration of a lens assembly according to still another one of certain embodiments.
Figure 12:
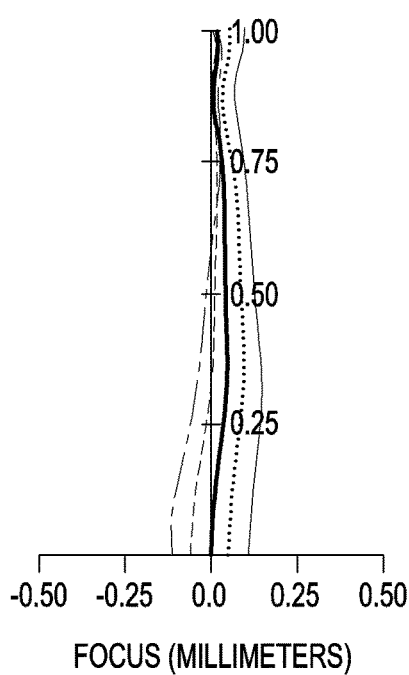
FIG. 12 is a graph illustrating spherical aberration of the lens assembly illustrated in FIG. 11.
Figure 13:
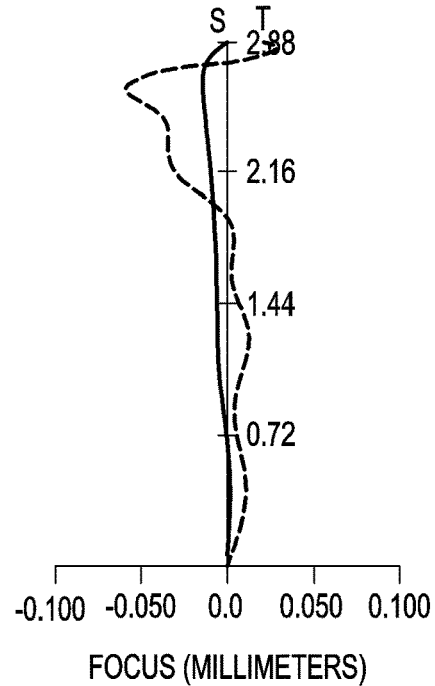
FIG. 13 is a graph illustrating astigmatism of the lens assembly illustrated in FIG. 11.
Figure 14:
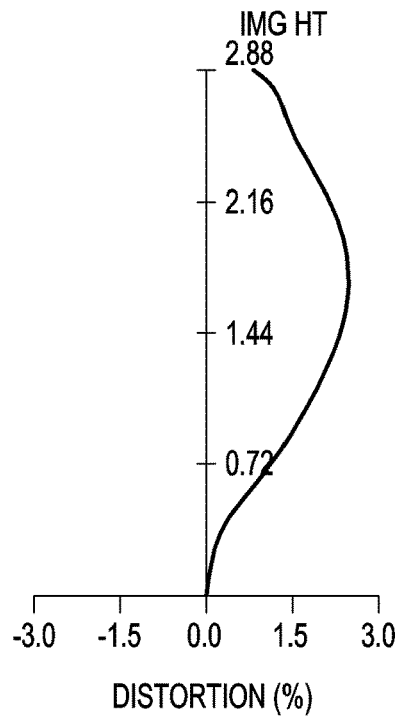
FIG. 14 is a graph illustrating distortion aberration of the lens assembly illustrated in FIG. 11.

FIG. 11 is a view illustrating a configuration of a lens assembly 300 according to still another one of certain embodiments. FIG. 12 is a graph illustrating spherical aberration of the lens assembly 300 illustrated in FIG. 11. FIG. 13 is a graph illustrating astigmatism of the lens assembly 300 illustrated in FIG. 11. FIG. 14 is a graph illustrating distortion aberration of the lens assembly 300 illustrated in FIG. 11.

Referring to FIGS. 11 to 14, a lens assembly 300 according to still another one of certain embodiments disclosed herein may include a plurality of lenses 310, 320, 330, 340, 350, and 360, an image sensor 380, and/or a filter 370.

According to certain embodiments, the lens assembly 300 may include a first lens 320 (e.g., the first lens 120 in FIG. 3), a second lens 330 (e.g., the second lens 130 in FIG. 3), a third lens 350 (e.g., the third lens 150 in FIG. 3), and a fourth lens 360 (e.g., the fourth lens 160 in FIG. 3). As another example, the lens assembly 300 may include a front lens 310 (e.g., the front lens 110 in FIG. 3) and/or a fifth lens 340 (e.g., the fifth lens 140 in FIG. 3).

Table 7 below shows various lens data of the lens assembly 300, and Tables 8 and 9 below show aspherical coefficients of the plurality of lenses 310, 320, 330, 340, 350, and 360. Here, the lens assembly 300 may have an F-number (F-No) of 1.87, an angle of view (ANG) of 76 degrees, a composite focal length (EFL) of 3.63 mm, and an image plane height ($Y_{1H}$) of 2.884 mm, and may satisfy at least one of the above-described conditions.

TABLE 7

| Surf | Radius (mm) | Thick (mm) | H-Ape | EFL | nd |
|---|---|---|---|---|---|
| obj | infinity | infinity | | | |
| Stp (23) | infinity | 0.66544 | 0.97 | | |
| S1* | 4.316 | 0.22 | 1.03 | −64.4719 | 1.5441 |
| S2* | 3.776 | 0.1 | 1.03 | | |
| S3* | 2.282 | 0.76 | 1.08 | 3.1516 | 1.5441 |
| S4* | −6.197 | 0.1 | 1.19 | | |
| S5* | 94.824 | 0.25 | 1.23 | −5.0135 | 1.82115 |
| S6* | 3.978 | 0.319 | 1.24 | | |
| S7* | 2.435 | 0.371 | 1.28 | −96.1147 | 1.67074 |
| S8* | 2.203 | 0.258 | 1.41 | | |
| S9* | 675.035 | 0.854 | 1.48 | 2.7658 | 1.5441 |
| S10* | −1.514 | 0.526 | 1.61 | | |
| S11* | 1.891 | 0.359 | 2.07 | −3.2147 | 1.5348 |
| S12* | 0.843 | 0.418 | 2.51 | | |
| S13 | infinity | 0.11 | 2.57 | | 1.5168 |
| S14 | infinity | 0.53767 | 2.61 | | |
| img | infinity | 0.0023 | | | |

TABLE 8

| Surf | S1 | S2 | S3 | S4 | S5 | S6 |
|---|---|---|---|---|---|---|
| K (Conic) | −45.2713807 | −5.11E+01 | −8.93E+00 | 9.98E+00 | −1.00E+00 | 5.26E+00 |
| A (4th) | 0.009778344 | 1.21E−02 | 2.87E−02 | −3.54E−02 | 3.30E−04 | −1.76E−02 |
| B (6th) | −0.026893711 | −5.96E−02 | 1.54E−02 | −1.38E−02 | −1.10E−02 | 1.72E−02 |
| C (8th) | −0.034394632 | 1.49E−01 | −3.77E−02 | 3.70E−02 | −1.98E−02 | −5.93E−02 |
| D (10th) | 0.178853678 | −2.82E−01 | −2.38E−02 | −1.52E−01 | 1.16E−02 | 6.24E−02 |
| E (12th) | −0.351404464 | 4.09E−01 | 9.22E−02 | 2.73E−01 | 8.65E−02 | −5.65E−03 |
| F (14th) | 0.46165885 | −3.77E−01 | −1.09E−01 | −2.61E−01 | −1.28E−01 | −2.95E−02 |
| G (16th) | −0.402417753 | 1.97E−01 | 6.03E−02 | 1.26E−01 | 6.99E−02 | 2.00E−02 |
| H (18th) | 0.2066126 | −4.14E−02 | −1.38E−02 | −2.50E−02 | −1.41E−02 | −4.56E−03 |
| J (20th) | −0.045417843 | 0.00E+00 | 0.00E+00 | 0.00E+00 | 0.00E+00 | 0.00E+00 |

TABLE 9

| Surf | S7 | S8 | S9 | S10 | S11 | S12 |
|---|---|---|---|---|---|---|
| K (Conic) | −0.285736278 | −1.908814346 | −1 | −4.357624826 | −4.812087891 | −2.95303965 |
| A (4th) | −0.14995323 | −0.121841191 | −0.003110585 | −0.075539481 | −0.300585305 | −0.158686113 |
| B (6th) | 0.049352368 | 0.015896456 | −0.043984334 | 0.034728504 | 0.204818176 | 0.087515762 |
| C (8th) | −0.073607687 | −0.019381507 | 0.033436561 | −0.021273374 | −0.176853649 | −0.036785363 |
| D (10th) | 0.12870498 | 0.044709276 | −0.128629516 | −0.00018058 | 0.140721448 | 0.012350441 |
| E (12th) | −0.150532853 | −0.04019213 | 0.240697094 | 0.004763215 | −0.074680127 | −0.003204858 |
| F (14th) | 0.083839526 | 0.015735401 | −0.200526749 | 0.004157992 | 0.024589149 | 0.000588266 |

TABLE 9-continued

| Surf | S7 | S8 | S9 | S10 | S11 | S12 |
|---|---|---|---|---|---|---|
| G (16th) | −0.017041098 | −0.002096643 | 0.086414526 | −0.004282018 | −0.004828376 | −6.95E−05 |
| H (18th) | 0 | 0 | −0.018998282 | 0.001191358 | 0.00051811 | 4.71E−06 |
| J (20th) | 0 | 0 | 0.001687955 | −1.10E−04 | −2.34E−05 | −1.39E−07 |

Figure 15:
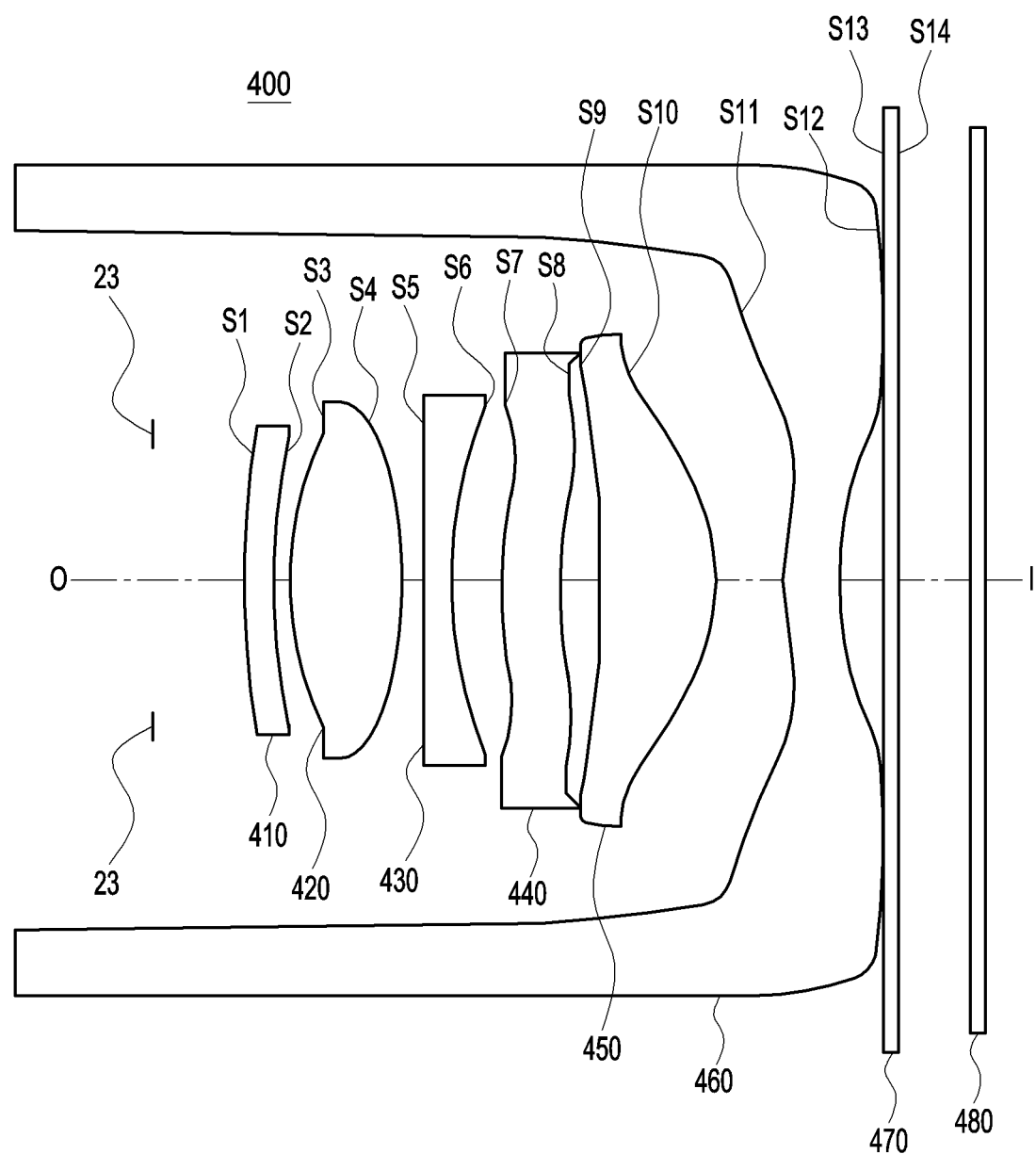
FIG. 15 is a view illustrating the configuration of a lens assembly according to still another one of certain embodiments.
Figure 16:
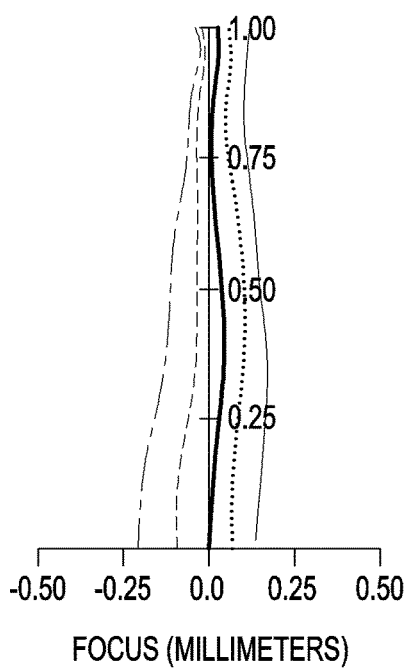
FIG. 16 is a graph illustrating spherical aberration of the lens assembly illustrated in FIG. 15.
Figure 17:
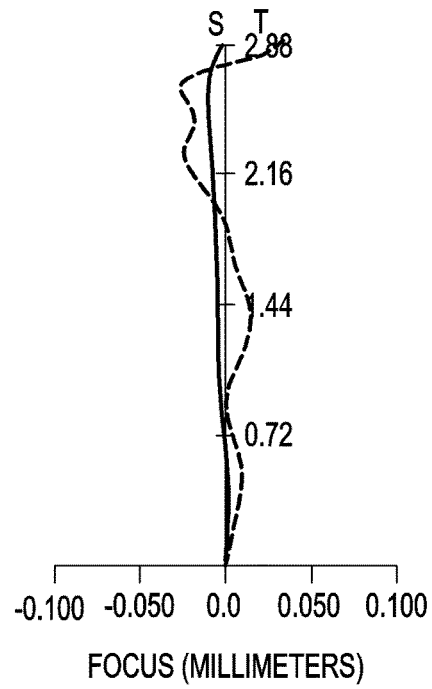
FIG. 17 is a graph illustrating astigmatism of the lens assembly illustrated in FIG. 15.
Figure 18:
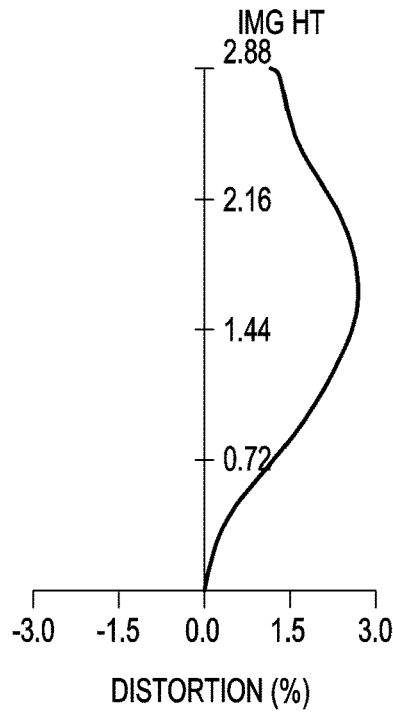
FIG. 18 is a graph illustrating distortion aberration of the lens assembly illustrated in FIG. 15.

FIG. 15 is a view illustrating a configuration of a lens assembly 400 according to still another one of certain embodiments disclosed herein. FIG. 16 is a graph illustrating spherical aberration of the lens assembly 400 illustrated in FIG. 15. FIG. 17 is a graph illustrating astigmatism of the lens assembly 400 illustrated in FIG. 15. FIG. 18 is a graph illustrating distortion aberration of the lens assembly 400 illustrated in FIG. 15.

Referring to FIGS. 15 to 18, a lens assembly 400 according to still another one of certain embodiments disclosed herein may include a plurality of lenses 410, 420, 430, 440, 450, and 460, an image sensor 480, and/or a filter 470.

According to certain embodiments, the lens assembly 400 may include a first lens 420 (e.g., the first lens 120 in FIG. 3), a second lens 430 (e.g., the second lens 130 in FIG. 3), a third lens 450 (e.g., the third lens 150 in FIG. 3), and a fourth lens 460 (e.g., the fourth lens 160 in FIG. 3). As another example, the lens assembly 400 may include a front lens 410 (e.g., the front lens 110 in FIG. 3) and/or a fifth lens 440 (e.g., the fifth lens 140 in FIG. 3).

Table 10 below shows various lens data of the lens assembly 400. Tables 11 and 12 below show aspherical coefficients of the plurality of lenses 410, 420, 430, 440, 450, and 460. Here, the lens assembly 400 may have an F-number (F-No) of 1.9, an angle of view (ANG) of 75 degrees, a composite focal length (EFL) of 3.68 mm, and an image plane height ($Y_{1H}$) of 2.884 mm, and may satisfy at least one of the above-described conditions.

TABLE 10

| Surf | Radius (mm) | Thick (mm) | H-Ape | EFL (mm) | nd |
|---|---|---|---|---|---|
| obj | infinity | infinity | | | |
| Stp (23) | infinity | 0.66703 | 0.97 | | |
| S1* | 4.188 | 0.22 | 1.03 | −37.8707 | 1.5441 |
| S2* | 3.419 | 0.1 | 1.03 | | |
| S3* | 2.18 | 0.769 | 1.08 | 2.9907 | 1.55332 |
| S4* | −6.092 | 0.1 | 1.19 | | |
| S5* | 353.247 | 0.25 | 1.22 | −5.206 | 1.8061 |
| S6* | 4.17 | 0.322 | 1.22 | | |
| S7* | 2.677 | 0.381 | 1.25 | −21.5401 | 1.67074 |
| S8* | 2.133 | 0.183 | 1.41 | | |
| S9* | 30.836 | 0.854 | 1.43 | 2.8968 | 1.5441 |
| S10* | −1.652 | 0.626 | 1.56 | | |
| S11* | 1.672 | 0.345 | 2.02 | −3.5456 | 1.5348 |
| S12* | 0.826 | 0.383 | 2.47 | | |
| S13 | infinity | 0.11 | 2.56 | | 1.5168 |
| S14 | infinity | 0.53961 | 2.59 | | |

TABLE 11

| Surf | S1 | S2 | S3 | S4 | S5 | S6 |
|---|---|---|---|---|---|---|
| K (Conic) | −46.23038783 | −4.94E+01 | −9.12E+00 | 1.00E+01 | −1.00E+00 | 5.12E+00 |
| A (4th) | 0.007772325 | 1.54E−02 | 2.60E−02 | −3.54E−02 | −1.57E−03 | −1.69E−02 |
| B (6th) | −0.016187188 | −7.51E−02 | 2.69E−02 | −1.28E−02 | −3.93E−03 | 1.45E−02 |
| C (8th) | −0.059805476 | 1.77E−01 | −7.05E−02 | 3.46E−02 | −4.97E−02 | −5.70E−02 |
| D (10th) | 0.217830914 | −3.04E−01 | 3.10E−02 | −1.51E−01 | 8.85E−02 | 5.94E−02 |
| E (12th) | −0.392411081 | 3.89E−01 | 3.62E−02 | 2.77E−01 | −2.22E−02 | −1.80E−04 |
| F (14th) | 0.475554134 | −3.13E−01 | −7.41E−02 | −2.68E−01 | −4.06E−02 | −3.57E−02 |
| G (16th) | −0.375761985 | 1.47E−01 | 4.91E−02 | 1.31E−01 | 3.26E−02 | 2.36E−02 |
| H (18th) | 0.176635766 | −2.84E−02 | −1.25E−02 | −2.59E−02 | −7.46E−03 | −7.46E−03 |
| J (20th) | −0.036661645 | 0.00E+00 | 0.00E+00 | 0.00E+00 | 0.00E+00 | 0.00E+00 |

TABLE 12

| Surf | S7 | S8 | S9 | S10 | S11 | S12 |
|---|---|---|---|---|---|---|
| K (Conic) | −0.558406992 | −1.723367638 | −1 | −4.471684137 | −5.992565541 | −2.912222686 |
| A (4th) | −0.152929134 | −0.115433493 | 0.009490118 | −0.08671104 | −0.317777792 | −0.193302939 |
| B (6th) | 0.041425405 | −0.008938129 | −0.060506476 | 0.069634373 | 0.2094761 | 0.124784662 |
| C (8th) | −0.055750368 | 0.020300748 | 0.033634027 | −0.096127284 | −0.167468275 | −0.061704891 |
| D (10th) | 0.116545845 | 0.008522234 | −0.119800241 | 0.100619228 | 0.12863865 | 0.023127428 |
| E (12th) | −0.159913355 | −0.018480638 | 0.255862151 | −0.078192451 | −0.067865275 | −0.006270921 |
| F (14th) | 0.0982206 | 0.008281073 | −0.233914115 | 0.045583506 | 0.02245652 | 0.001158517 |
| G (16th) | −0.021608522 | −0.00104166 | 0.109035026 | −0.016427103 | −0.004448619 | −0.000136273 |
| H (18th) | 0 | 0 | −0.025806594 | 0.00310547 | 0.000482321 | 9.16E−06 |
| J (20th) | 0 | 0 | 0.00246974 | −2.35E−04 | −2.20E−05 | −2.68E−07 |

Figure 19:
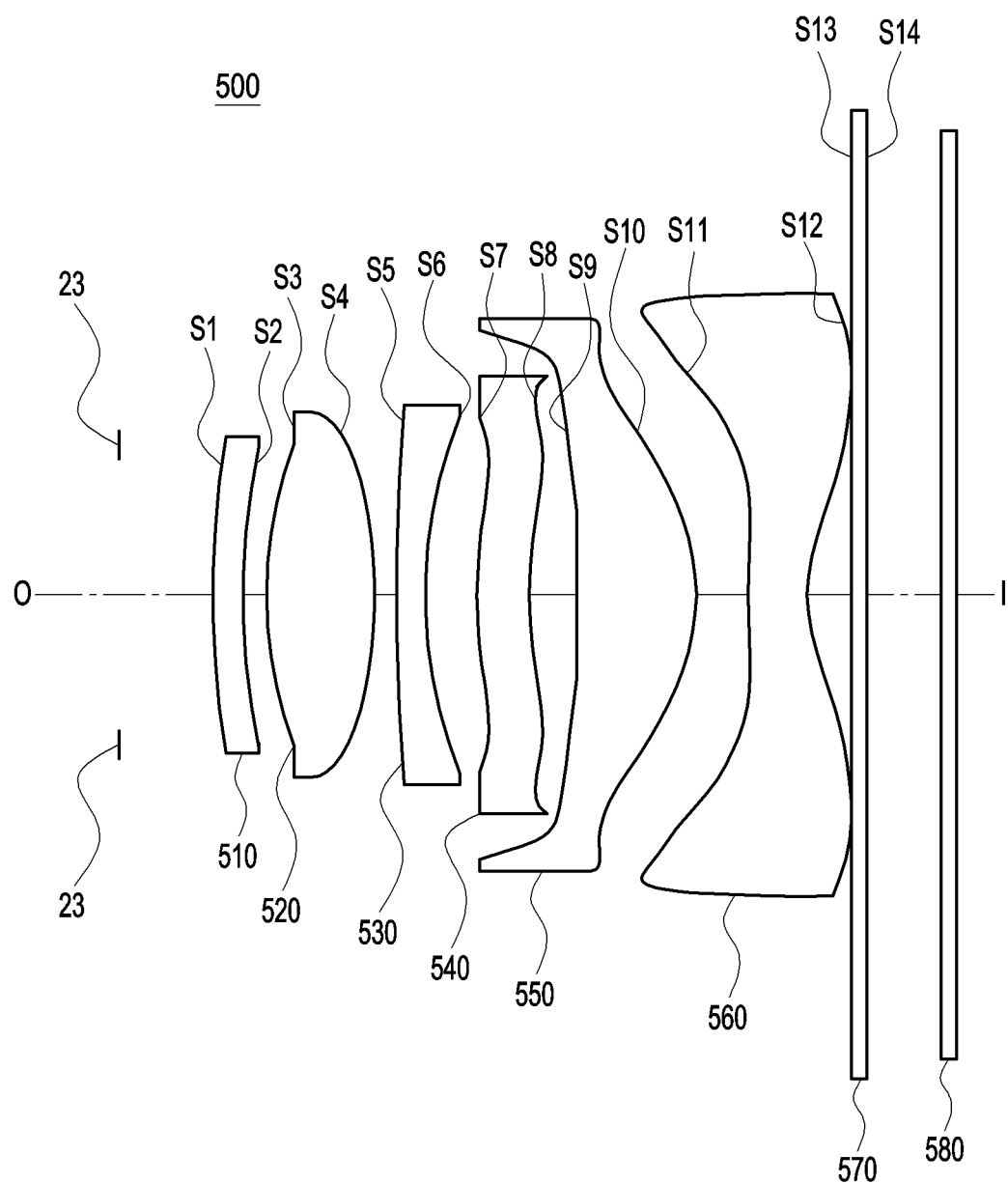
FIG. 19 is a view illustrating the configuration of a lens assembly according to still another one of certain embodiments.
Figure 20:
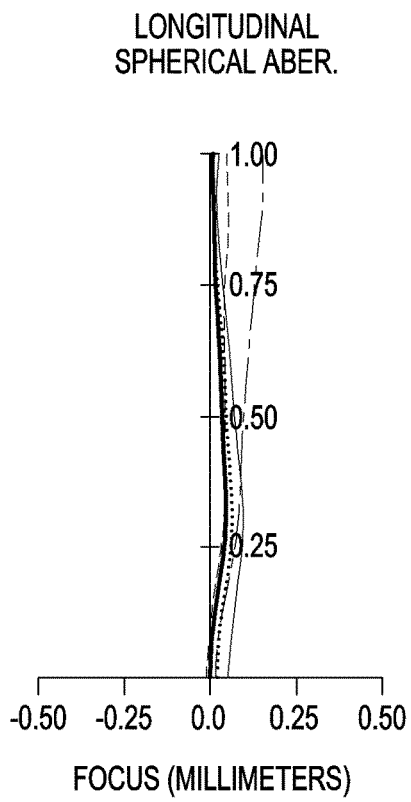
FIG. 20 is a graph illustrating spherical aberration of the lens assembly illustrated in FIG. 19.
Figure 21:
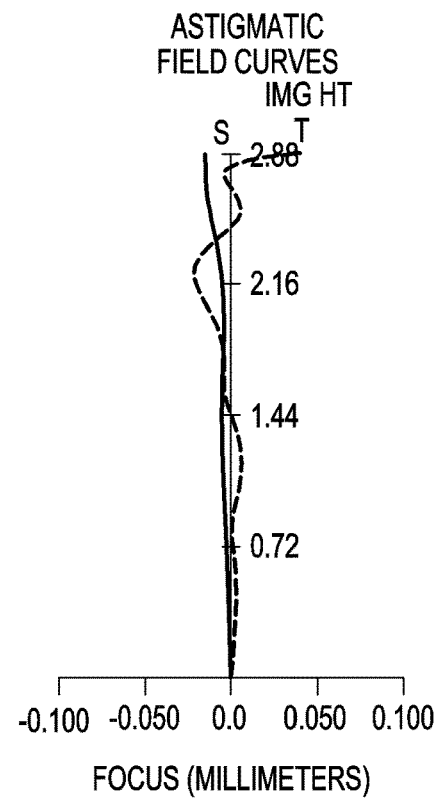
FIG. 21 is a graph illustrating astigmatism of the lens assembly illustrated in FIG. 19.
Figure 22:
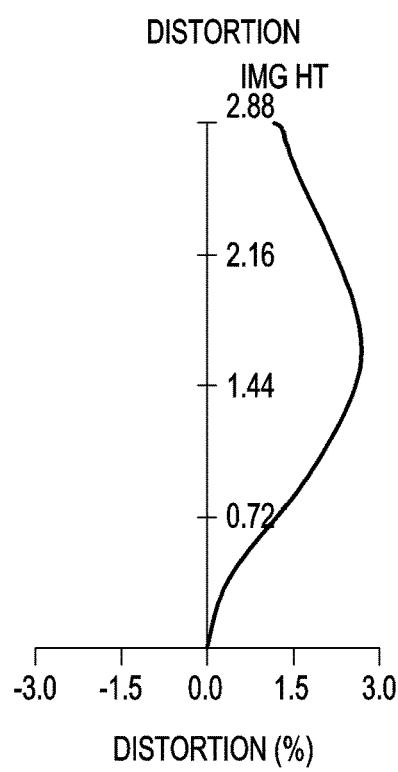
FIG. 22 is a graph illustrating distortion aberration of the lens assembly illustrated in FIG. 19.

FIG. 19 is a view illustrating a configuration of a lens assembly 500 according to still another one of certain embodiments. FIG. 20 is a graph illustrating spherical aberration of the lens assembly 500 illustrated in FIG. 19. FIG. 21 is a graph illustrating astigmatism of the lens assembly 500 illustrated in FIG. 19. FIG. 22 is a graph illustrating distortion aberration of the lens assembly 500 illustrated in FIG. 19.

Referring to FIGS. 19 to 22, a lens assembly 500 according to still another one of certain embodiments may include a plurality of lenses 510, 520, 530, 540, 550, and 560, an image sensor 580, and/or a filter 570.

According to certain embodiments, the lens assembly 500 may include a first lens 520 (e.g., the first lens 120 in FIG. 3), a second lens 530 (e.g., the second lens 130 in FIG. 3), a third lens 550 (e.g., the third lens 150 in FIG. 3), and a fourth lens 560 (e.g., the fourth lens 160 in FIG. 3). As another example, the lens assembly 500 may include a front lens 510 (e.g., the front lens 110 in FIG. 3) and/or a fifth lens 540 (e.g., the fifth lens 140 in FIG. 3).

Referring to FIGS. 3 and 19, the diameter of the fifth lens 540 illustrated in FIG. 19 may be smaller than that of the fifth lens 140 illustrated in FIG. 3.

Table 13 below show various lens data of the lens assembly 500, and each of Tables 14 and 15 below shows aspherical coefficients of the plurality of lenses 510, 520, 530, 540, 550, and 560. Here, the lens assembly 500 may have an F-number (F-No) of 1.9, an angle of view (ANG) of 76 degrees, a composite focal length (EFL) of 3.69 mm, and an image plane height ($Y_{1H}$) of 2.884 mm, and may satisfy at least one of the above-described conditions.

TABLE 13

| Surf | Radius (mm) | Thick (mm) | H-Ape | EFL (mm) | nd |
|---|---|---|---|---|---|
| obj | infinity | infinity | | | |
| Stp (23) | infinity | 0.66939 | 0.97 | | |
| S1* | 4.151 | 0.22 | 1.03 | −107.0181 | 1.5441 |
| S2* | 3.803 | 0.197 | 1.03 | | |
| S3* | 2.356 | 0.751 | 1.08 | 3.3738 | 1.55332 |
| S4* | −8.095 | 0.196 | 1.19 | | |
| S5* | 18.363 | 0.217 | 1.23 | −7.2906 | 1.67074 |
| S6* | 3.88 | 0.349 | 1.23 | | |
| S7* | 2.684 | 0.377 | 1.27 | 626.4854 | 1.67074 |
| S8* | 2.548 | 0.325 | 1.4 | | |
| S9* | −1343.4714 | 0.854 | 1.51 | 2.68 | 1.5441 |
| S10* | −1.463 | 0.355 | 1.66 | | |
| S11* | 4.336 | 0.389 | 1.79 | −2.3714 | 1.5348 |
| S12* | 0.954 | 0.28 | 2.44 | | |
| S13 | infinity | 0.11 | 2.64 | | 1.5168 |
| S14 | infinity | 0.53692 | 2.67 | | |
| img | infinity | 0.00307 | | | |

TABLE 14

| Surf | S1 | S2 | S3 | S4 | S5 | S6 |
|---|---|---|---|---|---|---|
| K (Conic) | −46.94416958 | −5.07E+01 | −8.62E+00 | 1.07E+01 | −1.00E+00 | 5.40E+00 |
| A (4th) | 0.008022773 | 1.49E−02 | 3.51E−02 | −3.49E−02 | 4.32E−03 | −2.09E−02 |
| B (6th) | −0.027149274 | −8.14E−02 | −7.94E−03 | −1.97E−02 | −1.26E−02 | 2.35E−02 |
| C (8th) | −0.00350513 | 2.30E−01 | −2.92E−02 | 4.83E−02 | −2.90E−02 | −6.19E−02 |
| D (10th) | 0.054277224 | −4.72E−01 | 6.10E−02 | −1.66E−02 | 6.14E−02 | 5.49E−02 |
| E (12th) | −0.071783794 | 6.77E−01 | −1.00E−01 | 2.87E−01 | −1.74E−02 | 7.20E−03 |
| F (14th) | 0.039299941 | −6.06E−01 | 8.63E−02 | −2.75E−01 | −2.40E−02 | −3.64E−02 |
| G (16th) | 0.012180362 | 3.18E−01 | −3.49E−02 | 1.35E−01 | 1.87E−02 | 2.06E−02 |
| H (18th) | −0.018623126 | −7.46E−02 | 3.41E−03 | −2.74E−02 | −4.01E−03 | −4.09E−03 |
| J (20th) | 0.003394417 | 0.00E+00 | 0.00E+00 | 0.00E+00 | 0.00E+00 | 0.00E+00 |

TABLE 15

| Surf | S7 | S8 | S9 | S10 | S11 | S12 |
|---|---|---|---|---|---|---|
| K (Conic) | −0.203705679 | −2.10114492 | −1 | −4.700735396 | −26.93309505 | −3.469475795 |
| A (4th) | −0.143297912 | −0.116079948 | 0.017641172 | −0.035072585 | −0.301594271 | −0.242039869 |
| B (6th) | 0.024906325 | −0.046193436 | −0.128768346 | −0.052969053 | 0.075671241 | 0.203599137 |
| C (8th) | 0.012265068 | 0.144403804 | 0.122929675 | 0.073237743 | 0.128784294 | −0.121868013 |
| D (10th) | −0.022012454 | −0.164560583 | −0.069235255 | −0.047247279 | −0.194915564 | 0.050960965 |
| E (12th) | −0.015802844 | 0.100302412 | 0.025670703 | 0.01143323 | 0.139921968 | −0.014790407 |
| F (14th) | 0.023423555 | −0.031883803 | 0.00069747 | 0.006657009 | −0.061178591 | 0.002883735 |
| G (16th) | −0.006128071 | 0.004346793 | −0.00557546 | −0.005221862 | 0.016362783 | −0.000357856 |
| H (18th) | 0 | 0 | 0.002031342 | 0.001264848 | −0.002435982 | 2.55E−05 |
| J (20th) | 0 | 0 | −0.000230642 | −1.07E−04 | 1.54E−04 | −7.94E−07 |

Figure 23:
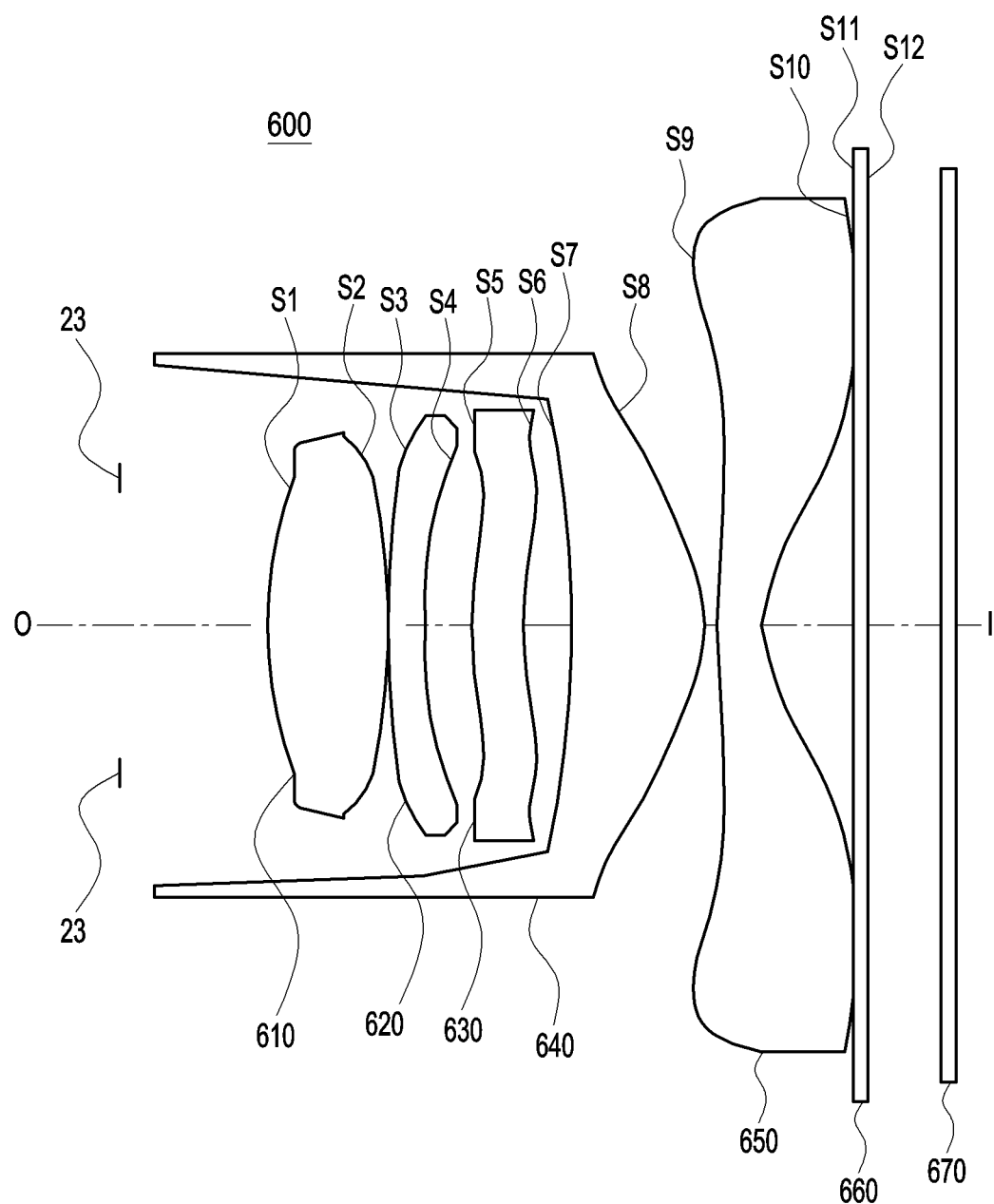
FIG. 23 is a view illustrating the configuration of a lens assembly according to yet another one of certain embodiments.
Figure 24:
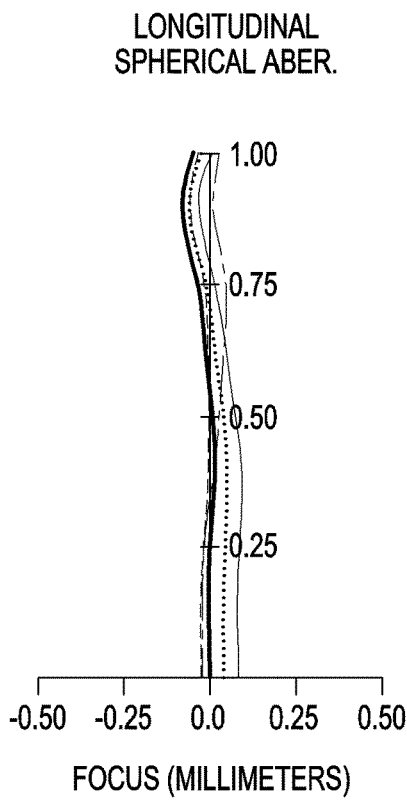
FIG. 24 is a graph illustrating spherical aberration of the lens assembly illustrated in FIG. 23.
Figure 25:
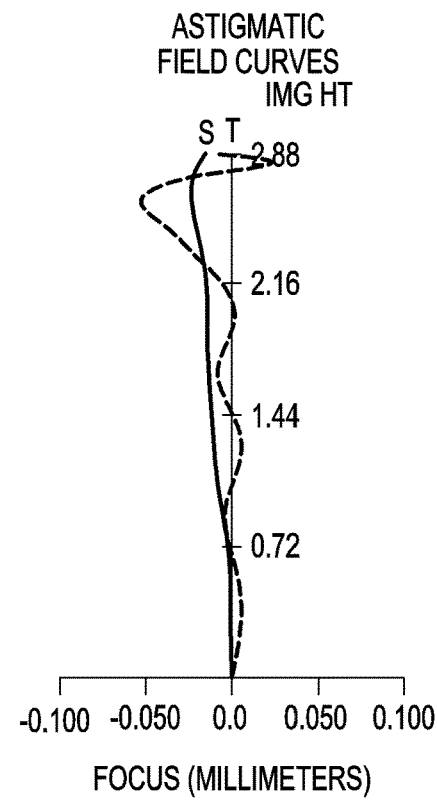
FIG. 25 is a graph illustrating astigmatism of the lens assembly illustrated in FIG. 23.
Figure 26:
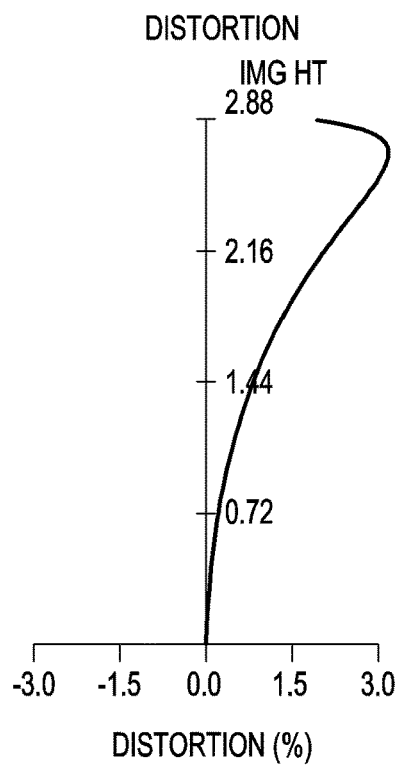
FIG. 26 is a graph illustrating distortion aberration of the lens assembly illustrated in FIG. 23.

FIG. 23 is a view illustrating a configuration of a lens assembly 600 according to still another one of certain embodiments. FIG. 24 is a graph illustrating spherical aberration of the lens assembly 600 illustrated in FIG. 23. FIG. 25 is a graph illustrating astigmatism of the lens assembly 600 illustrated in FIG. 23. FIG. 26 is a graph illustrating distortion aberration of the lens assembly 600 illustrated in FIG. 23.

Referring to FIGS. 23 to 26, a lens assembly 600 according to still another one of certain embodiments may include a plurality of lenses 610, 620, 630, 640, and 650, an image sensor 670, and/or a filter 660.

According to certain embodiments, the lens assembly 600 may include a first lens 610 (e.g., the first lens 120 in FIG. 3), a second lens 620 (e.g., the second lens 130 in FIG. 3), a third lens 640 (e.g., the third lens 150 in FIG. 3), and a fourth lens 650 (e.g., the fourth lens 160 in FIG. 3). As another example, the lens assembly 600 may include a fifth lens 630 (e.g., the fifth lens 140 in FIG. 3).

According to an embodiment, a front lens (e.g., the front lens 110 in FIG. 3) may not be provided in front of the first lens 610. For example, the lens disposed closest to the object-side in the lens assembly 600 may correspond to the first lens 610. Therefore, the front lens (e.g., the front lens 110 in FIG. 3) mentioned in the existing Equations 1 to 3 and Equation 5 described above may be replaced with the first lens 610 when applied to this embodiment.

Table 16 below show various lens data of the lens assembly 600, and each of Tables 17 and 18 below shows aspherical coefficients of the plurality of lenses 610, 620, 630, 640, and 650. Here, the lens assembly 500 may have an F-number (F-No) of 1.98, an angle of view (ANG) of 76 degrees, a composite focal length (EFL) of 3.61 mm, and an image plane height (Y1H) of 2.884 mm, and may satisfy at least one of the above-described conditions.

TABLE 16

| Surf | Radius (mm) | Thick (mm) | H-Ape | EFL (mm) | nd |
|---|---|---|---|---|---|
| obj | infinity | infinity | | | |
| Stp (23) | infinity | 0.71629 | 0.91 | | |
| S1* | 2.334 | 0.861 | 1.19 | 3.5143 | 1.5441 |
| S2* | −9.424 | 0.019 | 1.3 | | |
| S3* | 11.785 | 0.22 | 1.3 | −7.6426 | 1.67074 |
| S4* | 3.575 | 0.425 | 1.25 | | |
| S5* | 3.016 | 0.303 | 1.26 | −33.7535 | 1.67074 |
| S6* | 2.557 | 0.366 | 1.34 | | |
| S7* | −10.06 | 1 | 1.43 | 2.1889 | 1.5441 |
| S8* | −1.107 | 0.179 | 1.66 | | |
| S9* | 3.169 | 0.518 | 2.23 | −2.2639 | 1.5348 |
| S10* | 0.829 | 0.516 | 2.63 | | |
| S11* | infinity | 0.11 | 2.65 | | 1.5168 |
| S12* | infinity | 0.51429 | 2.68 | | |
| S13 | infinity | −0.0043 | | | |
| S14 | infinity | infinity | | | |
| img | infinity | 0.71629 | 0.91 | | |

TABLE 17

| Surf | S1 | S2 | S3 | S4 | S5 | S6 |
|---|---|---|---|---|---|---|
| K (Conic) | −8.162338148 | −3.84E+01 | −4.72E+00 | 4.02E+00 | 2.89E−01 | −1.36E+00 |
| A (4th) | 0.058899752 | −5.98E−03 | 3.55E−02 | −1.97E−02 | −1.89E−01 | −1.83E−01 |
| B (6th) | −0.068425643 | −4.45E−01 | −3.25E−01 | 1.24E−02 | 3.94E−02 | 1.21E−01 |
| C (8th) | 0.171090405 | 1.70E+00 | 1.10E+00 | −9.18E−02 | 1.81E−01 | −2.13E−01 |
| D (10th) | −0.624114308 | −3.80E+00 | −2.14E+00 | 2.34E−01 | −9.85E−01 | 2.98E−01 |
| E (12th) | 1.368897022 | 5.25E+00 | 2.67E+00 | −3.11E−01 | 2.14E+00 | −3.09E−01 |
| F (14th) | −1.821774375 | −4.60E+00 | −2.15E+00 | 2.32E−01 | −2.55E+00 | 2.54E−01 |
| G (16th) | 1.424645399 | 2.47E+00 | 1.07E+00 | −8.63E−02 | 1.71E+00 | −1.55E−01 |
| H (18th) | −0.605191736 | −7.43E−01 | −3.02E−01 | 1.18E−02 | −5.90E−01 | 5.88E−02 |
| J (20th) | 0.107713884 | 9.57E−02 | 3.70E−02 | 0.00E+00 | 8.06E−02 | −9.58E−03 |

TABLE 18

| Surf | S7 | S8 | S9 | S10 |
|---|---|---|---|---|
| K (Conic) | 0 | −3.915490926 | 0.414166036 | −3.853305357 |
| A (4th) | −0.014993198 | −0.047000861 | −0.177595376 | −0.083590718 |
| B (6th) | −0.00020553 | −0.03665924 | 0.058996093 | 0.037258616 |
| C (8th) | −0.092913097 | 0.071650479 | −0.007166371 | −0.010822937 |
| D (10th) | 0.164004045 | −0.05371223 | −0.002849721 | 0.001802152 |
| E (12th) | −0.168442982 | 0.006822628 | 0.00158064 | −0.00013537 |
| F (14th) | 0.136649405 | 0.018879516 | −0.000324572 | −2.55E−06 |
| G (16th) | −0.077236866 | −0.012940818 | 3.11E−05 | 1.09E−06 |
| H (18th) | 0.0244272 | 0.003343484 | −1.14E−06 | −5.16E−08 |
| J (20th) | −0.003159503 | −0.000314604 | 0 | 0.00E+00 |

In the above-described embodiments, various data about lenses may be checked in lens assemblies (e.g., 100, 200, 300, 400, 500, and 600) and/or an electronic device (e.g., the electronic device 1 in FIG. 2A) including the lens assemblies (e.g., 100, 200, 300, 400, 500, and 600). The data may satisfy the above-mentioned requirements, e.g., the results of Equations 1 to 7.

TABLE 19

| | FIG. 3 | FIG. 7 | FIG. 11 | FIG. 15 | FIG. 19 | FIG. 23 |
|---|---|---|---|---|---|---|
| Equation 1 | 1.129 | 1.129 | 1.128 | 1.128 | 1.13 | 1.142 |
| Equation 2 | 0.344 | 0.344 | 0.343 | 0.343 | 0.345 | 0.394 |
| Equation 3 | 0.942 | 0.942 | 0.942 | 0.942 | 0.942 | 0.765 |
| Equation 4 | 2.028 | 2.028 | 2.028 | 2.028 | 2.021 | 1.991 |
| Equation 5 | 0.232 | 0.232 | 0.231 | 0.231 | 0.232 | 0.248 |

TABLE 19-continued

| | FIG. 3 | FIG. 7 | FIG. 11 | FIG. 15 | FIG. 19 | FIG. 23 |
|---|---|---|---|---|---|---|
| Equation 6 | 1.671 | 1.671 | 1.821 | 1.806 | 1.671 | 1.671 |
| Equation 7 | 1.545 | 1.501 | 1.314 | 1.272 | 1.554 | 1.648 |

The lens assemblies 100, 200, 300, 400, 500, and 600 according to certain embodiments described above may be mounted and used in an electronic device (e.g., an optical device). An electronic device (e.g., an optical device) may further include an application processor (AP) in addition to the image sensors 180, 280, 380, 480, 580, and 670. Through the application processor (AP), the electronic device may drive, for example, an operating system or an application program so as to control a plurality of hardware or software components connected to the AP 21, may process various kinds of data, and may perform an arithmetic operation. As an example, the application processor (AP) may further include a graphic processing unit (GPU) and/or an image signal processor. When the application processor (AP) includes the image signal processor, an image (or a video) acquired by the image sensor 180, 280, 380, 480, 580, or 670 may be stored or output using the application processor (AP).

Figure 27:
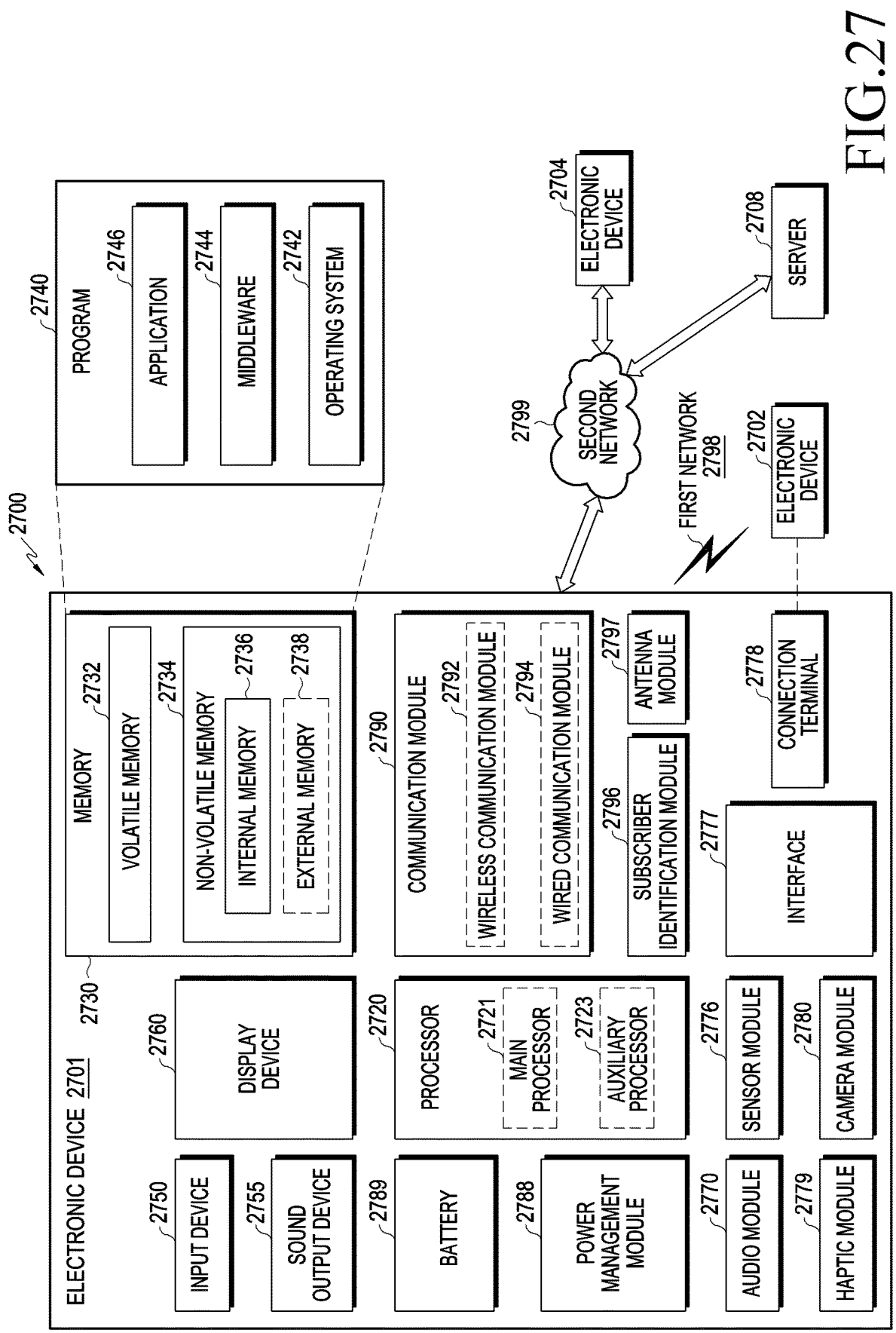
FIG. 27 is a block diagram of an electronic device (e.g., an optical lens system (or an optical device)) according to certain embodiments in a network environment.

FIG. 27 is a block diagram illustrating an electronic device 2701 (e.g., an optical device) in a network environment 2700 according to certain embodiments. Referring to FIG. 27, the electronic device 2701 (e.g., an optical device) in the network environment 2700 may communicate with an electronic device 2702 via a first network 2798 (e.g., a short-range wireless communication network), or an electronic device 2704 or a server 2708 via a second network 2799 (e.g., a long-range wireless communication network). According to an embodiment, the electronic device 2701 may communicate with the electronic device 2704 via the server 2708. According to an embodiment, the electronic device 2701 may include a processor 2720, memory 2730, an input device 2750, a sound output device 2755, a display device 2760, an audio module 2770, a sensor module 2776, an interface 2777, a haptic module 2779, a camera module 2780, a power management module 2788, a battery 2789, a communication module 2790, a subscriber identification module (SIM) 2796, or an antenna module 2797. In some embodiments, at least one (e.g., the display device 2760 or the camera module 2780) of the components may be omitted from the electronic device 2701, or one or more other components may be added in the electronic device 2701. In some embodiments, some of the components may be implemented as single integrated circuitry. For example, the sensor module 2776 (e.g., a fingerprint sensor, an iris sensor, or an illuminance sensor) may be implemented as embedded in the display device 2760 (e.g., a display).

The processor 2720 may execute, for example, software (e.g., a program 2740) to control at least one other component (e.g., a hardware or software component) of the electronic device 2701 coupled with the processor 2720, and may perform various data processing or computation. According to one embodiment, as at least part of the data processing or computation, the processor 2720 may load a command or data received from another component (e.g., the sensor module 2776 or the communication module 2790) in volatile memory 2732, process the command or the data stored in the volatile memory 2732, and store resulting data in non-volatile memory 2734. According to an embodiment, the processor 2720 may include a main processor 2721 (e.g., a central processing unit (CPU) or an application processor (AP)), and an auxiliary processor 2723 (e.g., a graphics processing unit (GPU), an image signal processor (ISP), a sensor hub processor, or a communication processor (CP)) that is operable independently from, or in conjunction with, the main processor 2721. Additionally or alternatively, the auxiliary processor 2723 may be adapted to consume less power than the main processor 2721, or to be specific to a specified function. The auxiliary processor 2723 may be implemented as separate from, or as part of the main processor 2721.

The auxiliary processor 2723 may control, for example, at least some of functions or states related to at least one component (e.g., the display device 2760, the sensor module 2776, or the communication module 2790) among the components of the electronic device 2701, instead of the main processor 2721 while the main processor 2721 is in an inactive (e.g., sleep) state, or together with the main processor 2721 while the main processor 2721 is in an active (e.g., executing an application) state. According to an embodiment, the auxiliary processor 2723 (e.g., an image signal processor or a communication processor) may be implemented as part of another component (e.g., the camera module 2780 or the communication module 2790) functionally related to the auxiliary processor 2723.

The memory 2730 may store various data used by at least one component (e.g., the processor 2720 or the sensor module 2776) of the electronic device 2701. The various data may include, for example, software (e.g., the program 2740) and input data or output data for a command related thererto. The memory 2730 may include the volatile memory 2732 or the non-volatile memory 2734.

The program 2740 may be stored in the memory 2730 as software, and may include, for example, an operating system (OS) 2742, middleware 2744, or an application 2746.

The input device 2750 may receive a command or data to be used by other component (e.g., the processor 2720) of the electronic device 2701, from the outside (e.g., a user) of the electronic device 2701. The input device 2750 may include, for example, a microphone, a mouse, a keyboard, or a digital pen (e.g., a stylus pen).

The sound output device 2755 may output sound signals to the outside of the electronic device 2701. The sound output device 2755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2760 may visually provide information to the outside (e.g., a user) of the electronic device 2701. The display device 2760 may include, for example, a display, a hologram device, or a projector and control circuitry to control a corresponding device. According to an embodiment, the display device 2760 may include touch circuitry adapted to detect a touch, or sensor circuitry (e.g., a pressure sensor) adapted to measure the intensity of force incurred by the touch.

The audio module 2770 may convert a sound into an electrical signal and vice versa. According to an embodiment, the audio module 2770 may obtain the sound via the input device 2750, or output the sound via the sound output device 2755 or an external electronic device (e.g., an electronic device 2702) (e.g., a speaker or a headphone) directly or wirelessly coupled with the electronic device 2701.

The sensor module 2776 may detect an operational state (e.g., power or temperature) of the electronic device 2701 or an environmental state (e.g., a state of a user) external to the electronic device 2701, and then generate an electrical signal or data value corresponding to the detected state. According to an embodiment, the sensor module 2776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2777 may support one or more specified protocols to be used for the electronic device 2701 to be coupled with the external electronic device (e.g., the electronic device 2702) directly or wirelessly. According to an embodiment, the interface 2777 may include, for example, a high definition multimedia interface (HDMI), a universal serial bus (USB) interface, a secure digital (SD) card interface, or an audio interface.

A connecting terminal 2778 may include a connector via which the electronic device 2701 may be physically connected with the external electronic device (e.g., the electronic device 2702). According to an embodiment, the connecting terminal 2778 may include, for example, a HDMI connector, a USB connector, a SD card connector, or an audio connector (e.g., a headphone connector).

The haptic module 2779 may convert an electrical signal into a mechanical stimulus (e.g., a vibration or a movement) or electrical stimulus which may be recognized by a user via his tactile sensation or kinesthetic sensation. According to an embodiment, the haptic module 2779 may include, for example, a motor, a piezoelectric element, or an electric stimulator.

The camera module 2780 may capture a still image or moving images. According to an embodiment, the camera module 2780 may include one or more lenses, image sensors, image signal processors, or flashes.

The power management module 2788 may manage power supplied to the electronic device 2701. According to one embodiment, the power management module 2788 may be implemented as at least part of, for example, a power management integrated circuit (PMIC).

The battery 2789 may supply power to at least one component of the electronic device 2701. According to an embodiment, the battery 2789 may include, for example, a primary cell which is not rechargeable, a secondary cell which is rechargeable, or a fuel cell.

The communication module 2790 may support establishing a direct (e.g., wired) communication channel or a wireless communication channel between the electronic device 2701 and the external electronic device (e.g., the electronic device 2702, the electronic device 2704, or the server 2708) and performing communication via the established communication channel. The communication module 2790 may include one or more communication processors that are operable independently from the processor 2720 (e.g., the application processor (AP)) and support a direct (e.g., wired) communication or a wireless communication. According to an embodiment, the communication module 2790 may include a wireless communication module 2792 (e.g., a cellular communication module, a short-range wireless communication module, or a global navigation satellite system (GNSS) communication module) or a wired communication module 2794 (e.g., a local area network (LAN) communication module or a power line communication (PLC) module). A corresponding one of these communication modules may communicate with the external electronic device via the first network 2798 (e.g., a short-range communication network, such as Bluetooth™, wireless-fidelity (Wi-Fi) direct, or infrared data association (IrDA)) or the second network 2799 (e.g., a long-range communication network, such as a cellular network, the Internet, or a computer network (e.g., LAN or WAN). These various types of communication modules may be integrated as a single component (e.g., a single chip), or may be implemented as multi components (e.g., multi chips) separate from each other. The wireless communication module 2792 may identify and authenticate the electronic device 2701 in a communication network, such as the first network 2798 or the second network 2799, using subscriber information (e.g., international mobile subscriber identity (IMSI)) stored in the subscriber identification module 2796.

The antenna module 2797 may transmit or receive a signal or power to or from the outside (e.g., the external electronic device) of the electronic device 2701. According to an embodiment, the antenna module 2797 may include an antenna including a radiating element composed of a conductive material or a conductive pattern formed on a substrate (e.g., PCB). According to an embodiment, the antenna module 2797 may include a plurality of antennas. In such a case, at least one antenna appropriate for a communication scheme used in the communication network, such as the first network 2798 or the second network 2799, may be selected, for example, by the communication module 2790 from the plurality of antennas. The signal or the power may then be transmitted or received between the communication module 2790 and the external electronic device via the selected at least one antenna. According to an embodiment, another component (e.g., RFIC) other than the radiating element may be additionally formed as part of the antenna module 2797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2701 and the external electronic device 2704 via the server 2708 coupled with the second network 2799. Each of the electronic devices 2702 and 2704 may be a device of a same type as, or a different type, from the electronic device 2701. According to an embodiment, all or some of operations to be executed at the electronic device 2701 may be executed at one or more of the external electronic devices 2702, 2704, or 2708. For example, if the electronic device 2701 should perform a function or a service automatically, or in response to a request from a user or another device, the electronic device 2701, instead of, or in addition to, executing the function or the service by itself, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2701. The electronic device 2701 may provide the outcome, with or without further processing of the outcome, as at least part of a reply to the request. To that end, a cloud computing, distributed computing, or client-server computing technology may be used, for example.

Figure 28:
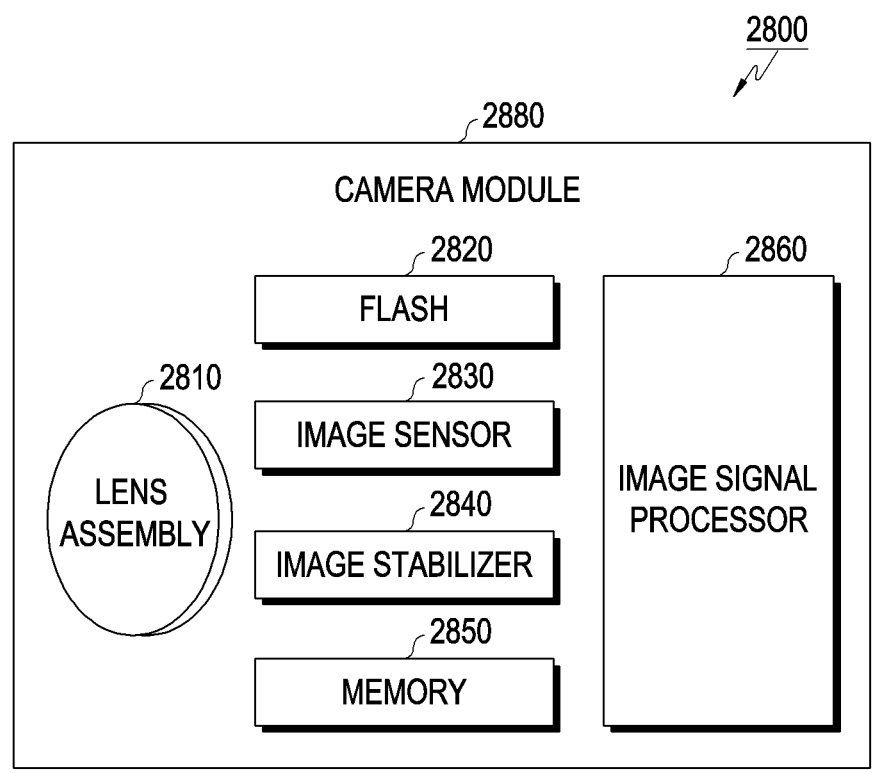
FIG. 28 is a block diagram exemplifying a camera module according to certain embodiments.

FIG. 28 is a block diagram 2800 illustrating the camera module 2880 (e.g., 2780 of FIG. 7) according to certain embodiments. Referring to FIG. 28, the camera module 2880 may include a lens assembly 2810, a flash 2820, an image sensor 2830, an image stabilizer 2840, memory 2850

(e.g., buffer memory), or an image signal processor 2860. The lens assembly 2810 may collect light emitted from an object whose image is to be taken. The lens assembly 2810 may include one or more lenses. According to an embodiment, the camera module 2880 may include a plurality of lens assemblies 2810. In such a case, the camera module 2880 may form, for example, a dual camera, a 360-degree camera, or a spherical camera. Some of the plurality of lens assemblies 2810 may have the same lens attribute (e.g., view angle, focal length, auto-focusing, f number, or optical zoom), or at least one lens assembly may have one or more lens attributes different from those of another lens assembly. The lens assembly 2810 may include, for example, a wide-angle lens or a telephoto lens.

The flash 2820 may emit light that is used to reinforce light emitted or reflected from an object. According to an embodiment, the flash 2820 may include one or more light emitting diodes (LEDs) (e.g., a red-green-blue (RGB) LED, a white LED, an infrared (IR) LED, or an ultraviolet (UV) LED) or a xenon lamp. The image sensor 2830 may obtain an image corresponding to an object by converting light emitted or reflected from the object and transmitted via the lens assembly 2810 into an electrical signal. According to an embodiment, the image sensor 2830 may include, for example, one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 2830 may be implemented using, for example, a charged coupled device (CCD) sensor or a complementary metal oxide semiconductor (CMOS) sensor.

The image stabilizer 2840 may move the image sensor 2830 or at least one lens included in the lens assembly 2810 in a particular direction, or control an operational attribute (e.g., adjust the read-out timing) of the image sensor 2830 in response to the movement of the camera module 2880 or the electronic device (e.g., 2701 of FIG. 27) including the camera module 2880. This allows compensating for at least part of a negative effect by the movement on an image being captured. According to an embodiment, the image stabilizer 2840 may sense such a movement by the camera module 2880 or the electronic device (e.g., 2701 of FIG. 27) using a gyro sensor (not shown) or an acceleration sensor (not shown) disposed inside or outside the camera module 2880. According to an embodiment, the image stabilizer 2840 may be implemented, for example, as an optical image stabilizer. The memory 2850 may store, at least temporarily, at least part of an image obtained via the image sensor 2830 for a subsequent image processing task. For example, if image capturing is delayed due to shutter lag or multiple images are quickly captured, a raw image obtained (e.g., a Bayer-patterned image or a high-resolution image) may be stored in the memory 2850, and its corresponding copy image (e.g., a low-resolution image) may be previewed via the display device (e.g., 2760 of FIG. 27). Thereafter, if a specified condition is met (e.g., by a user's input or system command), at least part of the raw image stored in the memory 2850 may be obtained and processed, for example, by the image signal processor 2860. According to an embodiment, the memory 2850 may be configured as at least part of the memory (e.g., 2730 of FIG. 27) or as a separate memory that is operated independently from the memory (e.g., 2730 of FIG. 27).

The image signal processor 2860 may perform one or more image processing with respect to an image obtained via the image sensor 2830 or an image stored in the memory 2850. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 2860 may perform control (e.g., exposure time control or read-out timing control etc.) with respect to at least one (e.g., the image sensor 2830) of the components included in the camera module 2880. An image processed by the image signal processor 2860 may be stored back in the memory 2850 for further processing, or may be provided to an external component (e.g., the memory (e.g., 2730 of FIG. 27), the display device (e.g., 2760 of FIG. 27), the electronic device (e.g., 2702 of FIG. 27), the electronic device (e.g., 2704 of FIG. 27), or the server (e.g., 2708 of FIG. 27)) outside the camera module 2880. According to an embodiment, the image signal processor 2860 may be configured as at least part of the processor (e.g., 2720 of FIG. 27), or as a separate processor that is operated independently from the processor (e.g., 2720 of FIG. 27). If the image signal processor 2860 is configured as a separate processor from the processor (e.g., 2720 of FIG. 27), at least one image processed by the image signal processor 2860 may be displayed, by the processor (e.g., 2720 of FIG. 27), via the display device (e.g., 2760 of FIG. 27) as it is or after being further processed.

According to an embodiment, the electronic device (e.g., 2701 of FIG. 27) may include a plurality of camera modules 2880 having different attributes or functions. In such a case, at least one of the plurality of camera modules 2880 may form, for example, a wide-angle camera and at least another of the plurality of camera modules 2880 may form a telephoto camera. Similarly, at least one of the plurality of camera modules 2880 may form a front camera and at least another of the plurality of camera modules 2880 may form a rear camera. The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program (e.g., 2740 of FIG. 27)) including one or more instructions that are stored in a storage medium (e.g., internal memory (e.g., 2736 of FIG. 27) or external memory (e.g., 2738 of FIG. 27) 2738) that is readable by a machine (e.g., the electronic device (e.g., 2701 of FIG. 27)). For example, a processor (e.g., the processor (e.g., 2720 of FIG. 27)) of the machine (e.g., the electronic device (e.g., 2701 of FIG. 27)) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments, it is possible to provide an optical lens system (e.g., the optical lens system 20 in FIG. 2A) of an electronic device (e.g., the electronic device 1 in FIG. 2A) including: a lens assembly (e.g., the lens assembly 100 in FIG. 3); an iris (e.g., the iris 23 in FIG. 3); and an image sensor (e.g., the image sensor 180 in FIG. 3) configured to form an image of an object corresponding to the lens assembly. The lens assembly may include a first lens (e.g., the first lens 120 in FIG. 3) having positive refractive power, and a second lens (e.g., the second lens 130 in FIG. 3) having negative refractive power. The iris, the first lens, and the second lens are sequentially arranged from an object-side to the image sensor-side along an optical axis (e.g., the optical axis O-I in FIG. 3), and the optical lens system of the electronic device satisfies Equations 1 and 2 below:

$$1.1 \leq \frac{STL}{TL} \leq 1.5 \qquad \text{[Equation 1]}$$

$$0.2 \leq \frac{S1}{EPD} \leq 1.0 \qquad \text{[Equation 2]}$$

(Here, STL is a distance from the iris to an image plane of the image sensor on the optical axis, TL is a distance from an object-side apex of a lens closest (e.g., the lens corresponding to the front lens 110 when the embodiment of FIG. 3 includes the front lens or corresponding to the first lens 120 when the embodiment of FIG. 3 does not include the front lens) to the object-side among a plurality of lenses included in the lens assembly to the image plane on the optical axis, EPD is a diameter of an entrance pupil of the optical lens system, and S1 is a distance from the iris to the lens closest to the object-side among the plurality of lenses included in the lens assembly).

According to certain embodiments, the lens assembly may be configured to be movable on the optical axis, and the iris may be fixed in position on the optical axis.

According to certain embodiments, the surface of at least one of the first lens or the second lens, which faces the object-side, may be convex, and the surface of the second lens, which faces the image-side, may be concave.

According to certain embodiments, the lens assembly may further include a front lens (e.g., the front lens 110 in FIG. 3) disposed between the iris and the first lens.

According to certain embodiments, the lens assembly may include at least four lenses by further including a third lens (e.g., the third lens 150 in FIG. 3) and a fourth lens (e.g., the fourth lens 160 in FIG. 3) between the second lens and the image sensor.

According to certain embodiments, it is possible to provide the optical lens system of the electronic device, which satisfies Equation 3 below:

$$0.7 \leq \frac{EPD}{Y1} \leq 1.0 \qquad \text{[Equation 3]}$$

(Here, EPD is the diameter of the entrance pupil of the optical lens system, Y1 is an effective diameter of the lens closest to the object-side among the plurality of lenses included in the lens assembly).

According to certain embodiments, it is possible to provide the optical lens system of the electronic device, which satisfies Equation 4 below:

$$1.5 \le \frac{STL}{Y_{1H}} \le 2.5 \qquad \text{[Equation 4]}$$

(Here, STL is the distance from the iris to the image plane on the optical axis, and $Y_{1H}$ is a height of the image plane).

According to certain embodiments, it is possible to provide the optical lens system of the electronic device, which satisfies Equation 5 below:

$$0.1 \le \frac{S1}{Y_{1H}} \le 1.0 \qquad \text{[Equation 5]}$$

(Here, S1 is the distance from the iris to the lens closest to the object-side among the plurality of lenses included in the lens assembly, and $Y_{1H}$ is a height of the image plane).

According to certain embodiments, it is possible to provide the optical lens system of the electronic device, which satisfies Equation 6 below:

$$1.65 < N2 \qquad \text{[Equation 6]}$$

(Here, N2 is a refractive index of the second lens in which the surface, which faces the image-side, is concave and has negative refractive power).

According to certain embodiments, it is possible to provide the optical lens system of the electronic device, which satisfies Equation 7 below:

$$1.2 \le \frac{f}{|f\max|} \le 2.0 \qquad \text{[Equation 7]}$$

(Here, f is a composite focal length of the optical lens system, and fmax is a focal length of a lens having strongest refractive power among the plurality of lenses).

According to certain embodiments, the lens assembly may include at least three plastic injection-molded aspheric lenses.

According to certain embodiments, the lens assembly may include at least one aspheric lens having at least one inflection point.

According to certain embodiments, it is possible to provide an electronic device (e.g., the electronic device 1 in FIG. 2A) including: an iris (e.g., the iris 23 in FIG. 2A); a lens assembly (e.g., the lens assembly 30 in FIG. 2A) movable in an optical axis direction; and an image sensor (e.g., the image sensor 180 in FIG. 3) having an image plane on which an image of an object is formed by the lens assembly. When focusing an image formed on the image plane, a distance between the iris and the image plane may be fixed, and the lens assembly may move in the optical axis direction.

According to certain embodiments, the lens assembly (e.g., the lens assembly 30 in FIG. 2A) may include at least four lenses including a first lens (e.g., the first lens 120 in FIG. 3) having positive refractive power and a second lens (e.g., the second lens 130 in FIG. 3) having negative refractive power, and the iris may be located closer to an object-side than an object-side surface of a lens closest to the object-side (e.g., the front lens 110 in the case of FIG. 3 or the first lens 610 in the case of FIG. 23) among the plurality of lenses of the lens assembly.

According to certain embodiments, any one of the first lens and the second lens located from the object-side in the lens assembly may have positive refractive power while the surface thereof facing the object-side is convex.

According to certain embodiments, a lens disposed at a rear stage of one of the first lens and the second lens may have negative refractive power while the surface thereof facing the image is concave.

According to certain embodiments, it is possible to provide an electronic device that satisfies Equations 1 and 2 below:

$$1.1 \le \frac{STL}{TL} \le 1.5 \qquad \text{[Equation 1]}$$

$$0.2 \le \frac{S1}{EPD} \le 1.0 \qquad \text{[Equation 2]}$$

(Here, STL is a distance from the iris to an image plane of the image sensor on the optical axis, TL is a distance from an object-side apex of the lens closest to the object-side among the plurality of lenses included in the lens assembly to the image plane on the optical axis, EPD is a diameter of an entrance pupil of the electronic device, and S1 is a distance from the iris to the lens closest to the object-side among the plurality of lenses included in the lens assembly).

According to certain embodiments, it is possible to provide an electronic device (e.g., the electronic device 1 in FIG. 2C) including: a window member (e.g., the window member 11 in FIG. 2C); a display panel (e.g., the display panel 12 in FIG. 2C) stacked on a rear surface of the window member; a lens assembly (e.g., the lens assembly 30 in FIG. 2C); an iris (e.g., the iris 23 in FIG. 2C); and an image sensor (e.g., the image sensor 180 in FIG. 3) having an image plane on which an image of an object is formed by the lens assembly. The iris may be installed such that a distance between the iris and the image plane is fixed, at least a portion of the iris may be located on a same plane as at least a portion of the display panel, and the iris may be located closer to the object-side than an object-side surface of a lens closest to the object-side of the lens assembly on the optical axis.

According to certain embodiments, the electronic device may further include a housing surrounding at least a portion of the lens assembly, and the iris may be disposed in a camera hole extending from at least one side of the housing and formed in an active area of the display panel.

According to certain embodiments, it is possible to provide an electronic device that satisfies Equations 1 and 2 below:

$$1.1 \le \frac{STL}{TL} \le 1.5 \qquad \text{[Equation 1]}$$

$$0.2 \le \frac{S1}{EPD} \le 1.0 \qquad \text{[Equation 2]}$$

(Here, STL is a distance from the iris to an image plane of the image sensor on the optical axis, TL is a distance from an object-side apex of the lens closest to the object-side among the plurality of lenses included in the lens assembly to the image plane on the optical axis, EPD is a diameter of an entrance pupil of the electronic device, and S1 is a distance from the iris to the lens closest to the object-side among the plurality of lenses included in the lens assembly).

According to certain embodiments, it is possible to provide an optical lens system (e.g., the optical lens system 20 in FIG. 2A) of an electronic device (e.g., the electronic device 1 in FIG. 2A) including: a lens assembly (e.g., the lens assembly 100 in FIG. 3); an iris (e.g., the iris 23 in FIG. 3); and an image sensor (e.g., the image sensor 180 in FIG. 3) configured to form an image of an object corresponding to the lens assembly. The lens assembly may include a front lens (e.g., the front lens 110 in FIG. 3) located closest from an object-side in the lens assembly; a first lens (e.g., the first lens 120 in FIG. 3) having positive refractive power; and a second lens (e.g., the second lens 130 in FIG. 3) having negative refractive power. The iris, the front lens, the first lens, and the second lens may be sequentially arranged from the object-side to the image sensor-side along an optical axis, and the optical lens system of the electronic device may satisfy Equations 1 and 2 below:

$$1.1 \leq \frac{STL}{TL} \leq 1.5 \qquad \text{[Equation 1]}$$

$$0.2 \leq \frac{S1}{EPD} \leq 1.0 \qquad \text{[Equation 2]}$$

(Here, STL is a distance from the iris to an image plane of the image sensor on the optical axis, TL is a distance from an object-side apex of the front lens to the image plane on the optical axis, EPD is a diameter of an entrance pupil of the optical lens system, and S1 is a distance from the iris to the front lens).

According to certain embodiments, it is possible to provide the optical lens system of the electronic device, which satisfies Equation 3 below:

$$0.7 \leq \frac{EPD}{Y1} \leq 1.0 \qquad \text{[Equation 3]}$$

(Here, EPD is the diameter of the entrance pupil of the optical lens system, and Y1 is an effective diameter of the front lens).

In the detailed description of certain embodiments disclosed herein, specific embodiments have been described. However, it will be evident to a person ordinarily skilled in the art that various modifications can be made without departing from the gist of the disclosure. For example, in a specific embodiment, the dimensions of a plurality of lenses or the like may be appropriately set depending on the structure, required specifications, actual use environment, or the like of a lens assembly to be actually manufactured or an electronic device in which the lens assembly is to be mounted.

What is claimed is:

1. An optical lens system of an electronic device, the optical lens system comprising:
   a lens assembly;
   an iris; and
   an image sensor configured to form an image of an object corresponding to the lens assembly,
   wherein the lens assembly includes:
   a first lens having positive refractive power; and
   a second lens having negative refractive power, and
   wherein the iris, the first lens, and the second lens are sequentially arranged from an object-side to an image sensor-side along an optical axis,
   wherein the electronic device further includes a housing surrounding at least a first portion of the lens assembly,
   wherein the iris is disposed in a camera hole of the electronic device formed in an active area of a display panel,
   wherein the iris is at least partially disposed in a plane of the display panel, and
   the optical lens system of the electronic device satisfies Equations 1 and 2 below:

$$1.1 \leq \frac{STL}{TL} \leq 1.5 \qquad \text{[Equation 1]}$$

$$0.2 \leq \frac{S1}{EPD} \leq 1.0 \qquad \text{[Equation 2]}$$

wherein, STL is a distance from the iris to an image plane of the image sensor on the optical axis,
   TL is a distance from an object-side apex of a lens closest to the object-side among a plurality of lenses included in the lens assembly to the image plane on the optical axis,
   EPD is a diameter of an entrance pupil of the optical lens system, and S1 is a distance from the iris to the lens closest to the object-side among the plurality of lenses included in the lens assembly,
   wherein the optical lens system further includes an extension extending from the housing of the lens assembly or from a fixed structure disposed in the electronic device, the extension at least partially enclosing a second portion of the lens assembly that extends beyond an interior of the housing, and an end thereof that is disposed at least partially within the camera hole, and
   wherein the iris is disposed at the end of the extension.

2. The optical lens system of claim 1, wherein the lens assembly is configured move on the optical axis, and the iris is fixed in position on the optical axis, and
   wherein the extension includes a sidewall extending vertically from the housing or from the fixed structure, the sidewall having a shape following a contour of the second portion of the lens assembly that extends beyond the interior of the housing.

3. The optical lens system of claim 1, wherein a surface of at least one of the first lens or the second lens, facing the object-side, is convex, and a surface of the second lens facing an image-side, is concave.

4. The optical lens system of claim 1, wherein the lens assembly further includes a front lens disposed between the iris and the first lens.

5. The optical lens system of claim 1, wherein the lens assembly further comprises a third lens and a fourth lens between the second lens and the image sensor.

6. The optical lens system of claim 1, wherein the optical lens system satisfies Equation 3 below:

$$0.7 \leq \frac{EPD}{Y1} \leq 1.0 \qquad \text{[Equation 3]}$$

wherein, Y1 is an effective diameter of the lens closest to the object-side among the plurality of lenses included in the lens assembly.

7. The optical lens system of claim 1, wherein the optical lens system satisfies Equation 4 below:

$$1.5 \leq \frac{STL}{Y_{1H}} \leq 2.5 \qquad \text{[Equation 4]}$$

wherein, $Y_{1H}$ is a height of the image plane.

8. The optical lens system of claim 1, wherein the optical lens system satisfies Equation 5 below:

$$0.1 \leq \frac{S1}{Y_{1H}} \leq 1.0 \qquad \text{[Equation 5]}$$

wherein, $Y_{1H}$ is a height of the image plane.

9. The optical lens system of claim 1, wherein the optical lens system satisfies Equation 6 below:

$$1.65 < N2 \qquad \text{[Equation 6]}$$

wherein N2 is a refractive index of the second lens in which a surface, which faces an image-side, is concave and has negative refractive power.

10. The optical lens system of claim 1, wherein the optical lens system satisfies Equation 7 below:

$$1.2 \leq \frac{f}{|f\max|} \leq 2.0 \qquad \text{[Equation 7]}$$

wherein, f is a composite focal length of the optical lens system, and fmax is a focal length of a lens having strongest refractive power among a plurality of lenses.

11. The optical lens system of claim 1, wherein the lens assembly includes at least three plastic injection-molded aspheric lenses.

12. The optical lens system of claim 1, wherein the lens assembly includes at least one aspheric lens having at least one inflection point.

13. An electronic device comprising:
an iris;
a lens assembly movable in an optical axis direction; and
an image sensor having an image plane configured to form an electronic signal representing an image formed by light from the lens assembly,
wherein, when focusing the image formed on the image plane, a distance between the iris and the image plane is fixed, and the lens assembly moves in the optical axis direction,
wherein the electronic device further includes a housing surrounding at least a portion of the lens assembly,
wherein the iris is disposed in a camera hole, the camera hole extending from at least one side of the housing and formed in an active area of a display panel,
wherein the iris is at least partially disposed in a plane of the display panel,
wherein the electronic device further includes an extension extending from the housing of the lens assembly or from a fixed structure disposed in the electronic device, the extension at least partially enclosing a second portion of the lens assembly that extends beyond an interior of the housing, and an end thereof that is disposed at least partially within the camera hole, and
wherein the iris is disposed at the end of the extension.

14. The electronic device of claim 13, wherein the lens assembly includes at least four lenses including a first lens having positive refractive power and a second lens having negative refractive power, and
the iris is located closer to an object-side than an object-side surface of a lens closest to the object-side among a plurality of lenses of the lens assembly.

15. The electronic device of claim 14, wherein the electronic device satisfies Equations 1 and 2 below:

$$1.1 \leq \frac{STL}{TL} \leq 1.5 \qquad \text{[Equation 1]}$$

$$0.2 \leq \frac{S1}{EPD} \leq 1.0 \qquad \text{[Equation 2]}$$

wherein STL is a distance from the iris to the image plane of the image sensor on the optical axis, TL is a distance from an object-side apex of the lens closest to the object-side among the plurality of lenses included in the lens assembly to the image plane on the optical axis, EPD is a diameter of an entrance pupil of the electronic device, and S1 is a distance from the iris to the lens closest to the object-side among the plurality of lenses included in the lens assembly.

16. An electronic device comprising:
a window member;
a display panel stacked on a rear surface of the window member;
a lens assembly;
an iris; and
an image sensor including an image plane configured to form an electronic signal representing an image formed by the lens assembly,
wherein the iris is fixed with respect to the image plane,
wherein at least a portion of the iris is located on a same plane as at least a portion of the display panel, and
the iris is located closer to an object-side than an object-side surface of a lens closest to the object-side of the lens assembly on an optical axis,
wherein the electronic device further includes a housing surrounding at least a first portion of the lens assembly,
wherein the iris is disposed in a camera hole of the electronic device formed in an active area of the display panel,
wherein the iris is at least partially disposed in a plane of the display panel,
wherein the electronic device further includes an extension extending from the housing of the lens assembly or from a fixed structure disposed in the electronic device, the extension at least partially enclosing a second portion of the lens assembly that extends beyond an interior of the housing, and an end thereof that is disposed at least partially within the camera hole, and
wherein the iris is disposed at the end of the extension.

17. The electronic device of claim 16, wherein the electronic device satisfies Equations 1 and 2 below:

$$1.1 \leq \frac{STL}{TL} \leq 1.5 \qquad \text{[Equation 1]}$$

$$0.2 \leq \frac{S1}{EPD} \leq 1.0 \qquad \text{[Equation 2]}$$

wherein, STL is a distance from the iris to the image plane of the image sensor on the optical axis, TL is a distance from an object-side apex of the lens closest to the object-side among a plurality of lenses included in the lens assembly to the image plane on the optical axis, EPD is a diameter of an entrance pupil of the electronic device, and S1 is a distance from the iris to the lens closest to the object-side among the plurality of lenses included in the lens assembly.

18. An optical lens system of an electronic device, the optical lens system comprising:
   a lens assembly;
   an iris; and
   an image sensor configured to form an image of an object corresponding to the lens assembly,
   wherein the lens assembly includes:
   a front lens located closest from an object-side in the lens assembly;
   a first lens having positive refractive power; and
   a second lens having negative refractive power,
   wherein the iris, the front lens, the first lens, and the second lens are sequentially arranged from the object-side to an image sensor-side along an optical axis,
   wherein the electronic device further includes a housing surrounding at least a first portion of the lens assembly,
   wherein the iris is disposed in a camera hole of the electronic device formed in an active area of a display panel,
   wherein the iris is at least partially disposed in a plane of the display panel, and
   the optical lens system of the electronic device satisfies Equations 1 and 2 below:

$$1.1 \leq \frac{STL}{TL} \leq 1.5 \quad \text{[Equation 1]}$$

$$0.2 \leq \frac{S1}{EPD} \leq 1.0 \quad \text{[Equation 2]}$$

wherein, STL is a distance from the iris to an image plane of the image sensor on the optical axis, TL is a distance from an object-side apex of the front lens to the image plane on the optical axis, EPD is a diameter of an entrance pupil of the optical lens system, and S1 is a distance from the iris to the front lens, wherein the optical lens system further includes an extension extending from the housing of the lens assembly or from a fixed structure disposed in the electronic device, the extension at least partially enclosing a second portion of the lens assembly that extends beyond an interior of the housing, and an end thereof that is disposed at least partially within the camera hole, and wherein the iris is disposed at the end of the extension.

19. The optical lens system of claim 18, wherein the optical lens system satisfies Equation 3 below:

$$0.7 \leq \frac{EPD}{Y1} \leq 1.0 \quad \text{[Equation 3]}$$

wherein Y1 is an effective diameter of the front lens.

* * * * *